United States Patent
Torre et al.

(10) Patent No.: US 7,925,565 B2
(45) Date of Patent: Apr. 12, 2011

(54) STOCHASTIC CONTROL SYSTEM AND METHOD FOR MULTI-PERIOD CONSUMPTION

(75) Inventors: Nicolo G. Torre, Oakland, CA (US); Andrew T. Rudd, Orinda, CA (US)

(73) Assignee: Advisor Software Inc., Lafayette, CA (US)

( * ) Notice: Subject to any disclaimer, the term of this patent is extended or adjusted under 35 U.S.C. 154(b) by 0 days.

(21) Appl. No.: 12/419,209

(22) Filed: Apr. 6, 2009

(65) Prior Publication Data
US 2009/0254491 A1    Oct. 8, 2009

Related U.S. Application Data

(63) Continuation of application No. 12/038,712, filed on Feb. 27, 2008, now Pat. No. 7,516,095.

(60) Provisional application No. 60/979,765, filed on Oct. 12, 2007.

(51) Int. Cl.
*G06Q 40/00* (2006.01)
(52) U.S. Cl. .................................................. 705/36 R
(58) Field of Classification Search ................ 705/35–45
See application file for complete search history.

(56) References Cited

U.S. PATENT DOCUMENTS

| | | | |
|---|---|---|---|
| 4,885,686 A | 12/1989 | Vanderbei | |
| 5,148,365 A * | 9/1992 | Dembo | 705/36 R |
| 5,216,593 A | 6/1993 | Dietrich et al. | |
| 5,787,283 A | 7/1998 | Chin et al. | |
| 5,884,276 A | 3/1999 | Zhu et al. | |
| 5,884,283 A | 3/1999 | Manos | |
| 5,913,198 A | 6/1999 | Banks | |
| 5,963,911 A | 10/1999 | Walker et al. | |
| 6,009,402 A | 12/1999 | Whitworth | |
| 6,012,044 A | 1/2000 | Maggioncalda et al. | |
| 6,021,397 A | 2/2000 | Jones et al. | |
| 6,032,123 A | 2/2000 | Jameson | |

(Continued)

FOREIGN PATENT DOCUMENTS

WO            02054294          7/2002

(Continued)

OTHER PUBLICATIONS

International Search Report, mailed Apr. 8, 2009, International Application No. PCT/US2008/079734.

(Continued)

*Primary Examiner* — Richard C Weisberger
(74) *Attorney, Agent, or Firm* — Haynes Beggel & Wolfeld LLP; Ernest J. Beffel, Jr.

(57) ABSTRACT

The present invention relates to dynamic optimization of system control over time. The need for dynamic optimization arises in many settings, as diverse as solar car power consumption during a multi-day race and retirement portfolio management. We disclose a reformulation of the control problem that overcomes the so-called "curse of dimensionality" and allows formulation of optimal control policies multiple period planning horizons. One optimal control policy is for power consumption by a solar car during a race, which involves many course segments, as course conditions vary through a day. Another is for risk in and consumption from a portfolio intended to support retirement. Both multi-period control policies take into account future uncertainty. Particular aspects of the present invention are described in the claims, specification and drawings.

14 Claims, 10 Drawing Sheets

U.S. PATENT DOCUMENTS

| | | | |
|---|---|---|---|
| 6,167,320 | A | 12/2000 | Powell |
| 6,182,007 | B1 | 1/2001 | Szczerba |
| 6,219,649 | B1 | 4/2001 | Jameson |
| 6,292,787 | B1 | 9/2001 | Scott et al. |
| 6,411,939 | B1 | 6/2002 | Parsons |
| 6,459,955 | B1 | 10/2002 | Bartsch et al. |
| 6,591,232 | B1 | 7/2003 | Kassapoglou |
| 6,606,527 | B2 | 8/2003 | de Andrade, Jr. et al. |
| 6,684,190 | B1 | 1/2004 | Powers et al. |
| 6,684,193 | B1 * | 1/2004 | Chavez et al. ............. 705/8 |
| 6,885,902 | B2 | 4/2005 | Crampton et al. |
| 6,898,472 | B2 | 5/2005 | Crampton et al. |
| 6,965,867 | B1 | 11/2005 | Jameson |
| 6,981,377 | B2 | 1/2006 | Vaynberg et al. |
| 7,050,873 | B1 | 5/2006 | Discenzo |
| 7,062,458 | B2 | 6/2006 | Maggioncalda et al. |
| 7,120,601 | B2 | 10/2006 | Chen et al. |
| 7,149,713 | B2 | 12/2006 | Bove et al. |
| 7,284,054 | B2 | 10/2007 | Radhakrishnan |
| 2001/0032029 | A1 | 10/2001 | Kauffman |
| 2002/0091604 | A1 | 7/2002 | Loeper |
| 2002/0147678 | A1 | 10/2002 | Drunsic |
| 2003/0126054 | A1 | 7/2003 | Purcell |
| 2003/0130975 | A1 | 7/2003 | Muller |
| 2003/0172018 | A1 | 9/2003 | Chen et al. |
| 2003/0195831 | A1 | 10/2003 | Feldman |
| 2003/0233301 | A1 | 12/2003 | Chen et al. |
| 2004/0199372 | A1 | 10/2004 | Penn |
| 2004/0205018 | A1 | 10/2004 | Degraaf et al. |
| 2005/0004855 | A1 | 1/2005 | Jenson et al. |
| 2005/0052080 | A1 | 3/2005 | Maslov et al. |
| 2005/0119959 | A1 | 6/2005 | Eder |
| 2005/0137172 | A1 | 6/2005 | Dalton et al. |
| 2005/0144110 | A1 | 6/2005 | Chen et al. |
| 2005/0167172 | A1 | 8/2005 | Fernandez |
| 2005/0183421 | A1 | 8/2005 | Vaynberg et al. |
| 2005/0187851 | A1 | 8/2005 | Sant |
| 2005/0209905 | A2 | 9/2005 | Ness et al. |
| 2006/0004653 | A1 | 1/2006 | Strongin |
| 2006/0036528 | A1 | 2/2006 | Harnsberger |
| 2006/0143103 | A1 | 6/2006 | Denne et al. |
| 2006/0190372 | A1 | 8/2006 | Chhabra et al. |
| 2006/0271466 | A1 | 11/2006 | Gorbatovsky |
| 2006/0278449 | A1 | 12/2006 | Torre-Bueno |
| 2007/0016432 | A1 | 1/2007 | Piggott et al. |
| 2007/0112475 | A1 | 5/2007 | Koebler et al. |
| 2007/0136148 | A1 | 6/2007 | Stremler et al. |
| 2007/0233594 | A1 | 10/2007 | Nafeh |
| 2007/0244777 | A1 | 10/2007 | Torre et al. |

FOREIGN PATENT DOCUMENTS

| | | | |
|---|---|---|---|
| WO | 03058542 | | 7/2003 |
| WO | WO/2005/119506 | * | 12/2005 |
| WO | 2006071718 | | 7/2006 |
| WO | 2006088550 | | 8/2006 |
| WO | 2007106519 | | 9/2007 |

OTHER PUBLICATIONS

Daniels, M.W., et al., Jun. 1999, "The Optimal Use of the Solar Power Automobile", Control Systems Magazine, IEEE, vol. 19, issue 3, pp. 12-22.

Cocco, J.F., Gomes, F.J. & Maenhout, P.J. 2005, "Consumption and Portfolio Choice over the Life Cycle", Review of Financial Studies, vol. 18, No. 2, pp. 491-533.

Kahvecioglu, D.C. 2006, Two Essays on Life Cycle Models, University of North Carolina at Chapel Hill.

Sondergeld, E.T., Drinkwater, M.F., Landsberg, D.G. & Selby, M.B. 2003, Retirement Planning Software, LIMRA International, Inc. and Society of Actuaries, USA.

Boland, J. et al., 2000, "Stochastic Optimal Control of a Solar Car", Centre for Industrial and Applicable Mathematics, University of South Australia.

Stefek, D., 2002, "The Barra Integrated Model", Barra, Inc.

Bruckenstein, J.P., 2005, "The Software You Need Now", www.financial-planning.com/pubs/fp/20051201015.html, accessed on May 2, 2006.

Bruckenstein, J., Oct. 2005, "No-Cost Retirement Planning Software", http://cfpnonline.com/past_issues.php?idArticle=1057&idPastIssue=102, accessed on May 2, 2006.

Chen, P. et al. Jun. 2003, "Merging Asset Allocation and Longevity Insurance: An Optimal Perspective on Payout Annuities," FPA Journal, http://www.fpanet.org/journal/articles/2003_Issues/jfp0603-art7.cfm?renderforprint=1, accessed on Apr. 25, 2006.

Chen, P. et al., Feb. 20, 2003, "Merging Asset Allocation and Longevity Insurance: An Optimal Perspective on Paul Annuities."

Guyton, J.T., Oct. 2004, "Decision Rules and Portfolio Management for Retirees: Is the 'Safe' Initial Withdrawal Rate Too Safe?" Journal of Financial Planning.

"Professional Advisor: The investment advice solution for financial professionals," mPower, 2002.

Punishill, J. et al., Sep. 25, 2002, "Grading Advisors' Planning Tools," WholeView TechStrategy Research, Forrester Research, Inc.

Rappaport, A.M., Apr. 15, 2003, "Retirement Planning Software for Tomorrow's Retirement," Mercer Human Resource Consulting.

Torre, N.G. et al., Summer 2004, "The Portfolio Management Problem of Individual Investors: A Quantitative Perspective," Advisor Software, as published in Institutional Investor's Guide to Integrated Wealth Management.

.Arsie, I., et al., A Parametric Study of the Design Variable for a Hybrid Electric Car with Solar Cells, Proceedings of the METIME Conference, Jun. 2005—dimec.unisa.it http://scholar.google.com/scholar?hl=en&lr=&cluster=14742562871641902068.

Goren, Sami, "The use of hydrogen powered buses in metropolitan areas," Dept of Environmental Engineering, Istanbul. http://www.ichet.org/ihec2005/files/manuscripts/Goren%20S.1-Tr.pdf.

Pudney, P., et al., Critical Speed Control of a Solar Car, Optimization and Engineering, vol. 3, No. 2/Jun. 2002, DOI: 10.1023/A:1020907101234, pp. 97-107, Posted: Nov. 2, 2004. http://www.springerlink.com/content/x232407132368012/.

Snowdon, David, "Hardware and Software Infrastructure for the Optimisation of Sunswift II," (2002). http://citeseer.ist.psu.edu/update/572215 http://www.cse.unsw.edu.au/~daves.

Thompson, Tyler, "EE395C Environmental Impact/Optimization Report Hydrogen Fuel Cells in Electric Automobiles," http://oak.cats.ohiou.edu/~tt106402/work/ee395c/Environmental%20Report.doc.

Abdelkhalek, A., "Parallelization, optimization, and performance analysis of portfolio choice models," in: Parallel Processing, International Conference, 2001, Publication Date: Sep. 3-7, 2001 On pp. 277-286, INSPEC Accession No. 7081902, DOI: 10.1109/ICPP.2001.952072, Posted online: Aug. 7, 2002.

Curcuru, S., et al., "Heterogeneity and Portfolio Choice: Theory and Evidence," Handbook of Financial Econometrics, 2004—gsbwww.uchicago.edu.

McClatchey, C.A., et al., "The Efficacy of Optimization Modeling as a Retirement Strategy in the Presence of Estimation Error," Financial Services Review, 2005 rmi.gsu.edu.

Mulvey, J.M., et al., Multi-stage Optimization for Long-term Investors, http://www.princeton.edu/~bcf, Sep. 2000.

Amman, H.M., et al., "Stochastic Policy Design in a Learning Environment with Rational Expectations1," Journal of Optimization Theory and Applications: vol. 105, No. 3, pp. 509-520, Jun. 2000.

Bied, Sina, et al., "Measuring the Costs of Inefficient Portfolio Strategies," Apr. 4, 2003. http://www-rcf.usc.edu/~martelli/papers/mcips.pdf.

Breeden, Douglas T., "An Intertemporal Asset Pricing Model With Stochastic Consumption and Investment Opportunities," Journal of Financial Economics 7 (1979) 265-296. http://scholar.google.com/scholar?hl=en&lr=&cluster=2713674126166465736.

Constantinides, George M. et al., "Stochastic Dominance Bounds on Derivatives Prices in a Multiperiod Economy with Proportional Transaction Costs," Aug. 2000. http://scholar.google.com/scholar?hl=en&lr=&cluster=2332467529025291484.

Keppo, Jussi, "On Arbitrage, Optimal Portfolio and Equilibrium under Frictions and Incomplete Markets," Helsinki University of Technology, Systems Analysis Laboratory, 1998. http://www.hut.fi/Units/Systems.Analysis. http://www.hut.fi/Units/SAL/Publications/pdf-files/rkep98a.pdf.

Kouwenberg, Roy, et al., "Stochastic Programming Models for Asset Liability Management," Hermes Center on Computational Finance and Economics Working Paper Jan. 1, 2001. http://citeseer.ist.psu.edu/kouwenberg01stochastic.html.

* cited by examiner

FIG.1
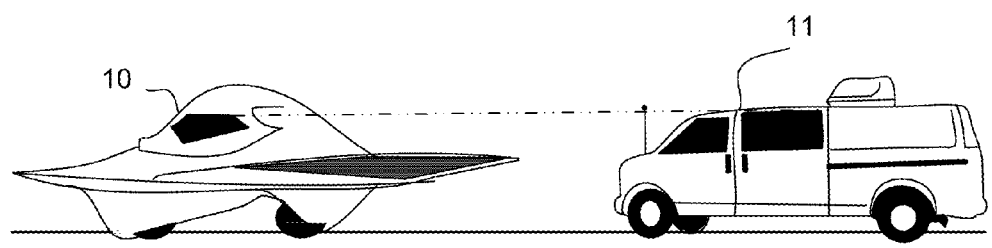
FIG. 2
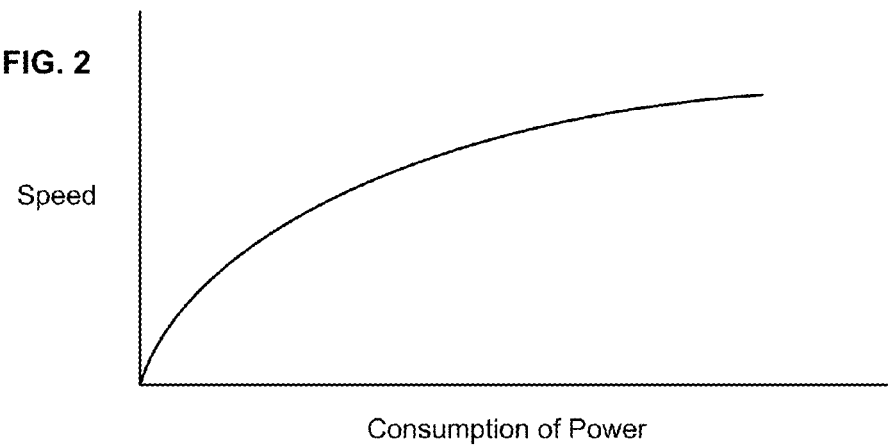
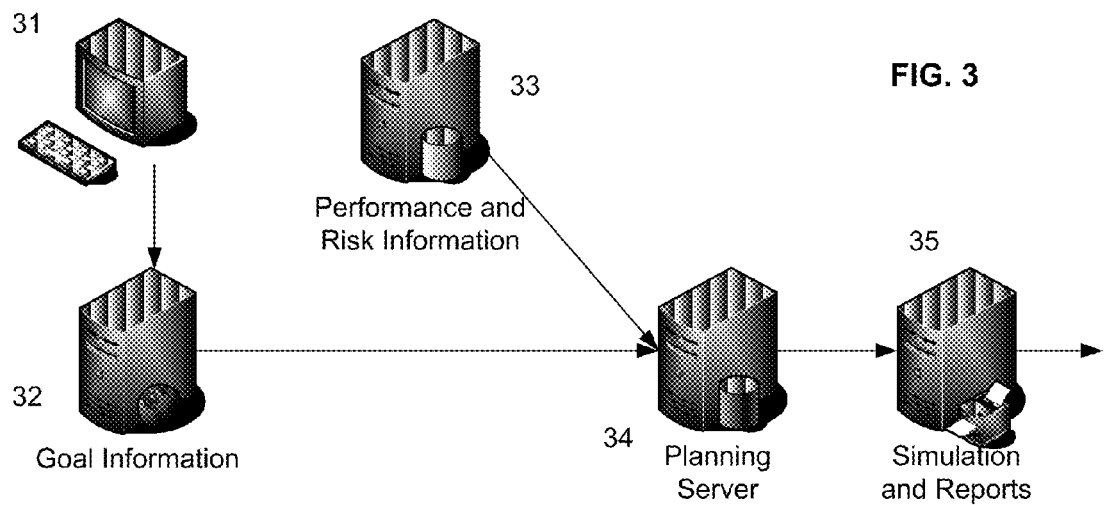

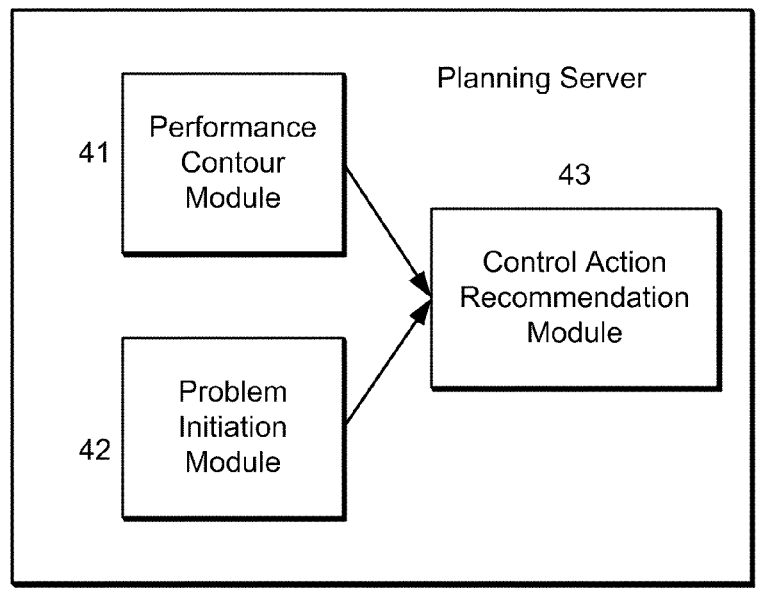
FIG.4
FIG. 5
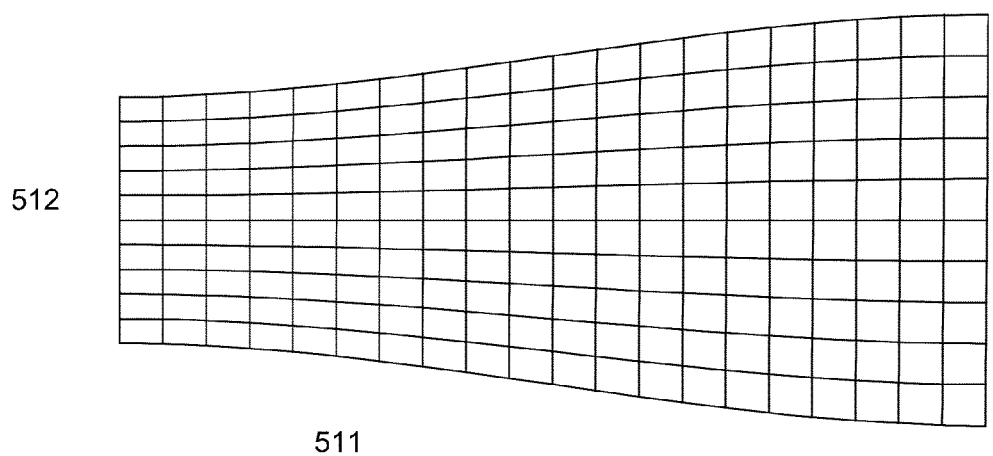

|  | US Cash | US Equity | Intl Equity | US Bonds | US CPI-linked Bonds | US Muni Bonds | US Real Estate | US Inflation |
|---|---|---|---|---|---|---|---|---|
| US Cash | 1.00 | | | | | | | |
| US Equity | 0.15 | 1.00 | | | | | | |
| International (Intl) Equity | 0.05 | 0.40 | 1.00 | | | | | |
| US Bonds | 0.30 | 0.50 | 0.05 | 1.00 | | | | |
| US CPI-linked Bonds | 0.40 | (0.30) | 0.00 | 0.40 | 1.00 | | | |
| US Muni Bonds | 0.25 | 0.20 | 0.00 | 0.85 | 0.30 | 1.00 | | |
| US Real Estate | 0.10 | 0.40 | 0.10 | (0.15) | 0.20 | (0.20) | 1.00 | |
| US Inflation | 0.60 | (0.10) | 0.10 | (0.30) | 0.80 | (0.30) | 0.20 | 1.00 |

Investment Assets
- Stock
- Fixed Income
- Cash

Non-Investment Assets
- Annuity Payments
- Real Estate
- Pension
- Social Security

FIG.14

| Resources | | Total $ | Total % |
|---|---|---:|---:|
| | Charles IRA | $450,000.00 | 8.00% |
| | Joint Investment Account | $1,540,980.00 | 28.00% |
| | Employee Stock Options | $350,000.00 | 6.00% |
| | Total Investments | $2,340,980.00 | 43.00% |
| | Home Value | $1,500,000.00 | 27.00% |
| | Human Capital | $1,450,000.00 | 26.00% |
| | Social Security Benefits | $200,000.00 | 4.00% |
| | Total Resources | $3,150,000.00 | 57.00% |
| | Total All Resources | $5,490,980.00 | 100.00% |

| Claims | | Total $ | Total % |
|---|---|---:|---:|
| | Mortgage | $470,000.00 | 9.00% |
| | Deferred Taxes | $400,000.00 | 7.00% |
| | Estimated Income Tax | $430,000.00 | 8.00% |
| | Valuation Adjustments | $53,000.00 | 1.00% |
| | Total Obligations | $1,353,000.00 | 25.00% |
| | Basic Income | $1,809,000.00 | 33.00% |
| | Education | $512,000.00 | 9.00% |
| | Total Primary | $2,321,000.00 | 42.00% |
| | Additional Income | $560,000.00 | 10.00% |
| | Basic Bequest | $450,000.00 | 8.00% |
| | Total Secondary | $1,010,000.00 | 18.00% |
| | Additional Bequest | $225,000.00 | 4.00% |
| | Total Additional | $225,000.00 | 4.00% |
| | Wealth Building | $806,980.00 | 11.00% |
| | Total Residual | $581,980.00 | 11.00% |
| | Total All Claims | $5,490,980.00 | 100.00% |

○ Secondary Goals

● Primary Goals

600K

| Time Period | Cash Flow | Required Investment Cash Flow | % Cash Flow From Investments |
| --- | --- | --- | --- |
| 2005 | $250,000.00 | $0.00 | 0.00% |
| 2005-2009 | $1,336,137.00 | $0.00 | 0.00% |
| 2010-2014 | $1,713,596.00 | $1,039,415.00 | 61.00% | ined by the claims. Those of ordinary skill in the art will
STOCHASTIC CONTROL SYSTEM AND METHOD FOR MULTI-PERIOD CONSUMPTION

RELATED APPLICATION

This application is a continuation of U.S. Pat. No. 7,516,095 to be issued Apr. 7, 2009, which claims the benefit of Provisional Application No. 60/979,765 filed Oct. 12, 2007. The provisional application and parent application are incorporated by reference.

This application is related to the earlier U.S. patent application Ser. No. 11/627,814 filed Jan. 26, 2007, which claimed the benefit of Provisional Application No. 60/785,117. As did the parent application, this application incorporates those two applications by reference, without a claim of priority.

This application is also related to U.S. patent application Ser. No. 12/028,684 filed 8 Feb. 2008, which is incorporated by reference, without a claim of priority.

BACKGROUND OF THE INVENTION

The present invention relates to dynamic optimization of system control over time. The need for dynamic optimization arises in many settings, as diverse as space ship control, solar car power consumption during a multi-day race, and retirement portfolio management. Generally, control actions at one time change the state of the system and optimum control actions at a later time. Control theory has broad applications. One of the classical papers in the early days of control theory was James Maxwell's paper "On governors" in the Proceedings of Royal Society, vol. 16 (1867-1868), which applied control theory to a machine governor, such as a centrifugal governor on a steam engine. One patent applies control theory to optimization of spacecraft trajectories and a spacecraft design, simultaneously. Wiffen, "Static/Dynamic Control for Optimizing a Useful Objective", U.S. Pat. No. 6,496,741 B1. As practical applications of his particular control theory, Wiffen identifies in cols. 13-14 spacecraft trajectory, spacecraft design, groundwater or soil decontamination, stabilizing vibrations in structures, maximizing the value of a portfolio, electric circuit design, design and operation of chemical reactors and design and operation of a water reservoir system.

Consider the problem of a solar car in a multi-day race with legs that must be completed between 9 am and 5 pm each day. The course is set and the topography known. The available solar power varies with the time of day (deterministic) and cloud cover (probabilistic). Success on a given day can be measured by time to complete the course leg and the charge level of car batteries when the sun sets. Because the car is racing, the desired final state is completion of all legs of the race in the least time possible with a minimum final battery charge level. The primary control variable is power consumption. State variables include charge level, available solar power, distance traveled and road grade (which is a function of distance traveled, because the course is set). Speed follows from the selected power consumption and the road grade. This presents a non-trivial dynamic optimization problem, particularly in an area with intermittent cloud cover. It appears at first to be a simpler problem than retirement portfolio management, because choosing how far to run down the battery charge level, given the expected availability of recharging solar power, does not involve a trade-off between risk and reward, as does portfolio management. However, as a race day evolves, the a priori likelihood of cloud cover will be updated, which complicates the problem and favors a risk budget, margin of safety approach to charge level.

An opportunity arises to devise an approach to dynamic optimization that allows practical application to problems involving consumption over time and uncertain replenishment of resources. Improved strategy design, control decisions and system operation will follow.

SUMMARY OF THE INVENTION

We disclose an approach to control optimization that makes multi-period optimization tractable. The first application presented is planning a race strategy for a solar car. The second application is planning strategy over time for a retirement portfolio.

BRIEF DESCRIPTION OF THE DRAWINGS

FIG. 1 depicts a solar car 10 in communication with a system that monitors battery level, position and speed.

FIG. 2 depicts a hypothetical curve for power consumption verses car speed.

FIG. 3 depicts a system that assembles goal, performance, and risk information to solve the multi-period control strategy problem.

FIG. 4 depicts modules of the planning server that combine to compile a set of control action recommendations.

FIG. 5 illustrates a simple search grid.

FIG. 14 depicts a lifetime resources and claims statement, adapted to retirement planning.

DETAILED DESCRIPTION

Figure 6:
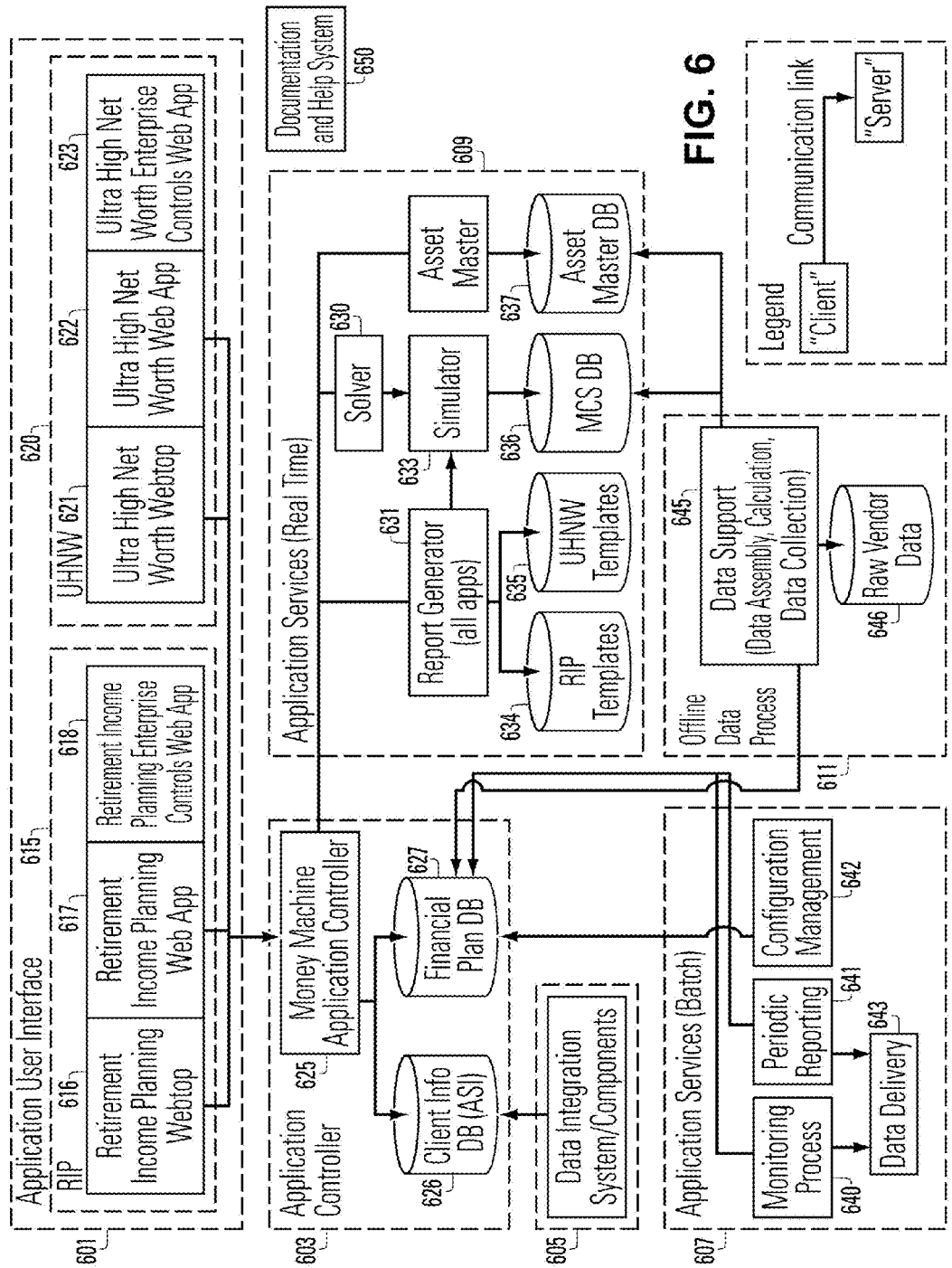
FIG. 6 depicts a high-level hardware architecture that can be used implement embodiments of the technology disclosed.
Figure 7:
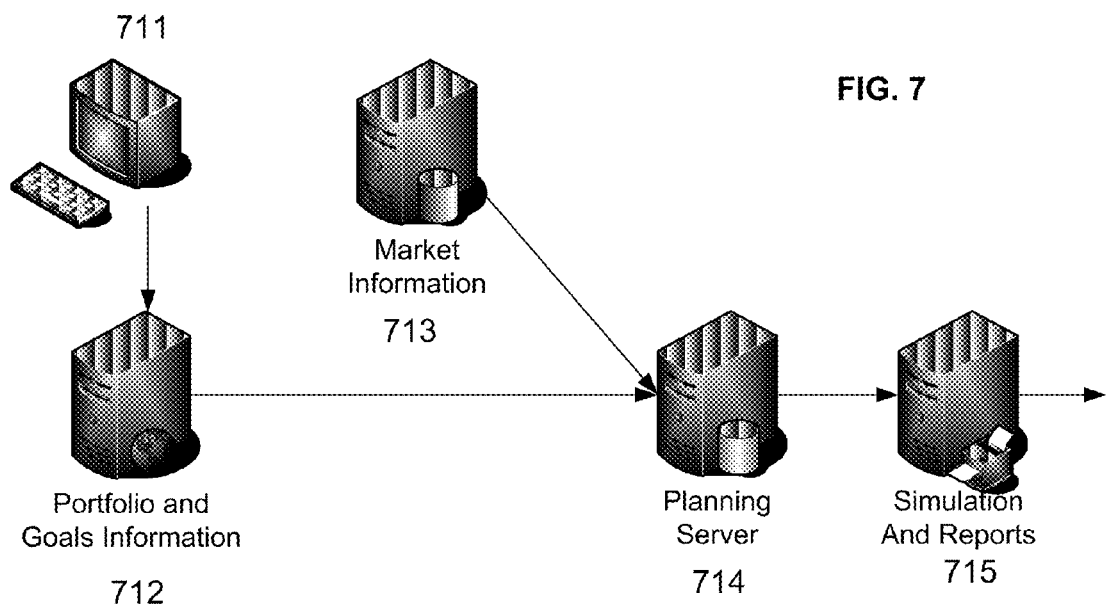
FIG. 7 depicts a system that assembles portfolio, goal, and market information to solve the multi-period control strategy problem.
Figure 8:
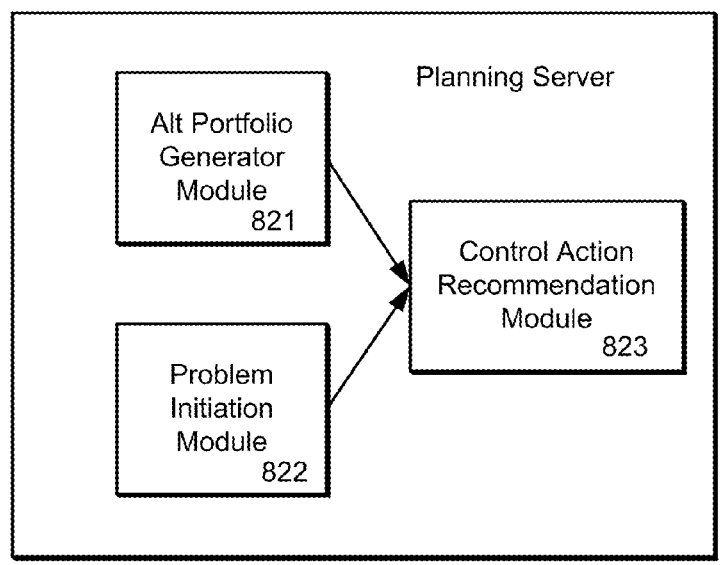
FIG. 8 depicts modules of the planning server that combine to compile a set of control action recommendations.

The following detailed description is made with reference to the figures. Preferred embodiments are described to illustrate the present invention, not to limit its scope, which is defined by the claims. Those of ordinary skill in the art will recognize a variety of equivalent variations on the description that follows.

Solar Car Consumption Control

This application begins with applying control theory to a solar car race in multiple stages. To state the problem clearly, consider a five stage solar car race subject to the vagaries of weather. This is a simplification of the World Solar Car Challenge or the North American Solar Car Challenge, in which universities and private institutions compete. See www.americansolarchallenge.org. The solar car is allowed a certain number of square feet of panels to convert sunlight into power. It also is permitted a certain battery capacity to help the car when the sun is obscured by clouds or low on the horizon. The race is conducted during the day. Adequate time is allowed to complete each stage before dark, at least if there are no mechanical breakdowns. Starts are staggered but predetermined. Electrical power generated by the cars' solar panels is a function of time of day and cloud cover. The time of day determines the angle of the sun and the vagaries of weather create a stochastic probability that less than the sun's full power will be available to generate electrical power. Finishing early has two advantages: it improves the team's score, since the winner has the least elapsed time through the competition, and it allows the solar panel to be reoriented to catch the full power of the sun—that is, the solar panel is tilted to face the sun. Completely draining the battery is considered disadvantageous, because the car requires more power to start motion than to continue it. Under maximum solar power with a full battery, the car can consume enough power to accelerate to and maintain the legal speed limit. Most of the time, the solar car travels at less than the legal speed limit to conserve power, because the power consumed is proportional to air resistance, which is proportional to the square of the car's velocity. The effect of power consumption on speed is further complicated by the road grade over the car's country course. The steepest parts of the road grade require either bright sunlight or battery assistance. In these parts of the course, having a charged battery has greater utility than when the car is going downhill. (Unlike most modern electrical cars, there is no reverse charging capability when the car goes downhill.) This is the nature of the multi-stage optimization problem.

Control theory and Bellman's algorithm provide a way to develop a control strategy in advance and refine it as better information becomes available about the weather conditions. An opportunity arises to develop a system and method that permit development of control strategies and real time refinement of control as the solar car progresses through the stages of the race and the short term weather forecast becomes more reliable. As in the Wiffen patent, the approach to control theory described in this paper has additional applications, such as portfolio management.

FIG. 1 depicts a solar car 10 in communication with a system that monitors battery level, position and speed. Typically, the driver of the solar car receives real time updates on suggested control from a system in a van 11 that follows the solar car. The system resides in the van to save weight, to draw on the van's power system, and to allow the analyst more opportunity to concentrate on monitoring and control recommendations than the car driver could.

FIG. 2 depicts a hypothetical curve for power consumption verses car speed. It does not include the power consumption for starting the car. A family of curves as depicted in FIG. 2 can be used to take into account the impact of road grade on performance. When the car is going up hill, power will be required to overcome gravity. When going downhill, gravity will assist in powering the car.

FIG. 3 depicts a system that assembles goal, performance and risk information to solve the multi-period control strategy problem. A terminal 31 is used to configure goal information, typically using a web server 32. Performance and risk information is compiled in a performance and risk information server 33. Performance information is keyed to at least battery power consumption, solar power consumption and road grade. A family of curves as depicted in FIG. 2 can be used to capture these factors. The road grade, at least, will vary according the car's position along the course. With additional refinement, the performance curves could take into account factors such as wind encountered by the solar car, which overlap with risk information. The risk information includes maximum available solar energy and probability of obscured solar energy. The maximum solar energy varies with the time of day, as the sun's angle to the horizon rises and falls, because the incident angle of the sun changes, both relative to the thickness of the atmosphere through which the sun light passes and relative to the orientation of solar cells on the solar car. When the solar car is at rest, the maximum solar energy still varies with the incident angle of the sun, but the solar panels can be reoriented toward the sun by lifting panels from the surface of the car. The planning server 34 applies Bellman's algorithm or a variation on Bellman's algorithm to determine the expected utility of alternative control actions. It selects at least an immediate control action for the solar car driver to take. It can develop a control strategy to be followed at varying points along the course, consistent with the current state of the race. The simulation and report server 35 varies the probabilistic factors, applies the control strategy and simulates elapsed time. By studying the simulations, a race team could determine how much battery charge to consume or accumulate, given the time of day, the position on the course, the current battery charge, the current weather (obscured solar power) and the risk of bad weather over the remainder of the course.

FIG. 4 depicts modules of the planning server that combine to compile a set of control action recommendations. The performance contour module 41 provides a family of performance curves that present speed as a function of power consumption. The family of curves could be indexed by road grade, which is a function of location along the course. Optionally, the family of curves could also take into account wind conditions that degrade or enhance car performance. Then, the curves would be indexed by road grade and wind conditions.

The problem initiation module 42 assigns a search grid spanning at least a time horizon, range of performance risks, range of current resources, and range of consumption. A simple grid is illustrated in FIG. 5. The illustration makes it clear that points along the grid need not be equally spaced. For search efficiency, unequally spaced points may be best. For search efficiency, the search may be conducted once with a coarse grid and then again with a finer grid and narrower ranges. Some values may be represented by continuous values while others are represented by discrete values. The time horizon may best be expressed as location on the course, time of day and elapsed time. These three factors combine to express where the solar car is in the race. The range of performance risks relates to weather. The weather forecast during the car design phase will be very generic. During the race, it will be refined and may even be predictable with little variance for a few hours at a time. The distribution of expected weather will vary by location along the course. It also may vary by time of day, especially if the race is run in an area subject to afternoon thunderstorms. The distribution of expected weather can be expressed as a probability that the solar power will be obscured, given a location and, optionally, given a time of day. A family of distributions of expected weather could be constructed for use during the race, as opposed to use during the design phase. The range of current resources will include available battery and solar power. The solar power available can either be combined with battery power to speed the car along, or can be diverted to charge the battery. One control strategy that the system could evaluate or simulate would be using battery power when the sun is low and recharging the battery when the sun is high. Another control strategy to evaluate would be using battery power when climbing a grade and charging the batteries when coasting down hill.

The control action recommendation module 43 applies Bellman's algorithm, which is further explained in following sections. It begins at the end of the race and iterates backwards from various potential outcomes. Each potential outcome has an expected utility. In a race setting, the utility function may be a linear function of total elapsed time. The faster the car finishes the race, the better. The final state of the car finds it at the finish line location with the battery nearly exhausted, because the car is free to consume more battery power as the risk of running low on power diminishes. The final state of the car also includes the total elapsed time, which is likely to range within reasonably predictable bounds. Iterating backwards through the search grid, for combinations of position on the time horizon and current resources, the algorithm determines the utility of particular control actions. The utility of particular control actions depends on the likely weather during an increment of time (and progress along the course), the control action chosen and the expected utility of the resulting system state after the control action is taken. The expected utility is determined by applying the weather probability distribution to the current state and control action. Depending on how obscured the sun is, more or less energy will be available to power the car or charge the battery. Iterating backwards through the search grid, the expected utility of control actions can be calculated, because the expected utility of later stages of the search grid has already been determined.

The output of the control action recommendation module is data that can be used to immediately recommend a control action, to devise an overall strategy for the race, or to simulate a range of control actions.

Portfolio Management

Seminal work in portfolio management has been done by Harry Markowitz and Robert C. Merton, both honored with Nobel Prizes in Economics. Merton's book, "Continuous-Time Finance" (Blackwell 1990) is a modern classic, which presents an analytical approach to selecting assets to hold in a portfolio, assuming non-negative consumption. The book carries the analytical approach only so far, to a portfolio that includes just two assets: a growth-optimum portfolio and a riskless security. (Ch. 6.3, p. 184) Applying Bellman's algorithm, a closed form solution to the optimum mix is illustrated for two assets. However, the mathematical approach quickly becomes intractable as complicating factors are taken into account. In the literature, one can find discussion of a portfolio with three assets, one riskless and two risky securities, but not a generalization to ten or twenty assets. See, e.g., Akian, M, A. Sulem and M. Taksar (2001). Dynamic optimization of long term growth rate for a portfolio with transaction costs and logarithmic utility. Mathematical Finance 11(2), 153-188. Accessed at http://citeseer.ist.psu.edu/akian00dynamic.html, on Sep. 29, 2007. Applying Merton's insight to practical problems has been treated as one of "Tomorrow's Hardest Problems." Martin B. Haugh, Andrew W. Lo, "Computational Challenges in Portfolio Management," Computing in Science and Engineering, vol. 03, no. 3, pp. 54-59, May/June, 2001. Accessed at http://csdl2.computer.org/persagen/DLAbsToc.jsp?resourcePath=/dl/mags/cs/&toc=comp/mags/cs/2001/03/c3toc.xml&DOI=10.1109/5992.919267#additionalInfo, on Sep. 29, 2007.

Hardware and Software Architectures

FIG. 6 depicts a high-level hardware architecture that can be used to implement embodiments of the technology disclosed. The major groupings of this hardware architecture are applications and user interface 601, application controller 603, data integration 605, batch application services 607, real-time application services 609 and off-line data processes 611. The legend indicates that a client system is linked in communication with a server system. As depicted, this hardware is arranged in an application service provider (ASP) configuration, which means that certain processes, such as computing intensive processes, security sensitive processes and processes that rely on subscription or proprietary data are hosted on servers. In some implementations, the servers will be remotely hosted. Some customers will set up their own servers. A shared server is useful for computing intensive processes, because the computing resources can be shared among many users. In the disclosure that follows, it will be apparent that a few analysis steps involve many times more computing resources than all the data entry steps that precede analysis. A shared server also is useful for security sensitive processes, because fewer systems need to be secured than if all of the sensitive data were downloaded to all of the workstations used for data entry. A shared server is further useful for processes that rely on subscription or proprietary data, because subscriptions often are priced based on the number of servers updated on a regular basis. It may be less expensive or more convenient to update a single server or server farm and perform calculations from the updated hardware than it would be to distribute the subscription data to numerous workstations. Of course, while an ASP model has advantages, some workstations are capable of running both the client and server side of an application. That is, they can run a server such as Apache and also run a browser such as Mozilla that accesses the server.

The application user interface 601 depicts alternative interface applications, complementary levels of service and complementary user and administrative interfaces. The retirement income planning module 615 and the ultra high net worth module 620 represent complementary levels of service and interface structures adapted to different customers. The retirement income planning module 615 potentially includes alternative Web App 616 and thick client 617 interfaces. The retirement income planning Web App 616 is commonly known as a thin client. It can be implemented using JavaScript and a conventional browser such as Microsoft Internet Explorer, Netscape's browser, Opera, Safari, Mozilla's Foxfire or another browser. Other implementation software options such as PHP, Perl and Java also are available for thin clients. The retirement planning Webtop 617 is commonly known as a thick client. Some of the programming languages for preparing a thick client include Java and the visual languages, such as Visual Basic and Visual C++. In addition to thick and thin client interfaces, the retirement income planning application includes an enterprise control Webtop 618 (or Web App) that one or more analysts would use to store and manipulate data for a plurality of customers. The ultra high net worth module 620 similarly includes a Web App thin client 621, a Webtop thick client 622 and an enterprise control Web App or Webtop 623. The modules of the application or user interface 601 typically are operated on a laptop, desktop or workstation. The application user interfaces are coupled in communication with an application controller module 603.

The application controller module 603 may include a money machine application controller 625, a client information database 626 and a financial plan database 627. The application controller 603 manages updating of client-related input and invokes real-time application services 609. The application controller process 625 accesses and updates a client information database 626 and a financial plan database 627, responsive to requests from the application and user interface 601. A data integration module 605 can be invoked by the application controller to import information for the client database 626 from an external source such as a brokerage client application. The data integration module 605 also can be invoked by the application controller to import information for the financial plan database 627, such as stock holdings from a client asset list. More than one client asset list may be accessible to the data integration module 605, such as a first asset list for holdings managed by a particular analyst and additional asset lists for brokerage accounts managed elsewhere. Changes in client information or asset lists may be published for access by the data integration module 605 and automatically posted to the client information database 626 and/or the financial plan database 627, without invocation by the application controller module 603. Alternatively, the application controller 625 can publish to the application and user interface 601 the availability of updated data and post updates to the databases 626, 627 under user control, mediated by the application controller module.

The financial plan database 627 further is subject to updating by the batch application services 607 and the off-line data process 611. The batch application services 607 may include a monitoring process 640, a periodic reporting process 641, a data delivery process 643 and a configuration management process 642. The monitoring process 640 repeatedly and periodically checks the status of client assets against the plan. It also may check liabilities. This monitoring process 640 is more persistent and consistently available to watch for variations between the plan and the market than either a client or analyst would be, as the process 640 does not become distracted or take vacations. The monitoring process can monitor for variations from the plan such as a need to rebalance the portfolio, a lack of stop loss orders, or a general deterioration in a segment of the client's asset base. The monitoring process may detect deterioration in asset segments more readily and accurately than either a client or analyst would. It uses the data delivery process 643 to reach the client or analyst by predetermined means, consistent with the urgency of a particular alert.

A periodic reporting module 641 may generate reports on demand or at predetermined periods, such as weekly, monthly or quarterly. The monitoring process 640 and periodic reporting process 641 can be connected to a data delivery process 643 that transmits alerts or periodic reports to the client and/or analyst. The data delivery process in 643 may send e-mails, SMS messages, faxes, pages or other alerts. The alerts may provide complete information or a link to a location at which complete information can be accessed.

The off-line data process may include data support 645 and raw vendor data. The raw vendor data 646 is depicted as a database, but may be a Web service or other online source. Raw vendor data may include asset pricing and asset characteristics, such as estimates of volatility and covariance or correlation of performance among asset classes. Data support 645 may include data assembly, calculation and data collection.

The application controller 625 may invoke real-time application services 609. In one embodiment, application services include a report generator 631, a solver and simulator 630, 632 and an asset master 633. In turn, these processes are connected to databases 634-637. As client information is entered, the asset master 633 and asset master database 637 may be accessed for templates used to assemble information about particular client assets and goals or concrete objectives. Reference to master templates simplifies the extension and updating of system designs. Once assets and goals have been entered, the solver 630 and simulator 632 can be invoked. The solver is beyond the scope of this application. One form of simulation uses Monte Carlo simulation. The simulator 632 may access the Monte Carlo simulation database 636. Simulation parameters such as number of simulation runs, time interval, probability distributions for model factors, probability distributions for particular assets given particular model factors, covariance factors and similar data may usefully be maintained in a simulation database. The simulation parameters may reflect a random walk approach, a trending approach, or other approach to the relationship of model factors in successive periods.

Introduction to Our Control Strategy

In this patent, we disclose an investment philosophy embedded in a system and methods. This philosophy is firmly rooted in the considerable body of financial research which has been conducted in recent decades. An important part of that research is often known as Modern Portfolio Theory. We go beyond prior research to also consider the insights developed by Behavioral Finance and the discipline of Wealth Management generally.

A key finding is that the most important determinant of investment results is the investment structure. In the simplest case, all funds are held in a single account. In this case the investment structure is fixed once we pick a strategic asset allocation for the account and establish a rebalancing policy. For instance, a possible investment structure would be 60% equities and 40% bonds, rebalanced quarterly. In more complex cases, funds are spread among multiple accounts. Funds in various accounts may differ in terms of taxability (e.g., an IRA account versus a regular brokerage account), in terms of ownership point versus separate property) or in terms of purpose (general funds versus funds dedicated to a specific purpose.) Considering multiple accounts, the investment structure problem includes picking strategic asset allocations and rebalancing policies for each account and setting policies for transferring funds between accounts so that the joint whole achieves the best possible performance.

In the case of the single account portfolio where the investment structure question is simply an asset allocation decision, the basic finding is that the investment structure choice determines 90% of the investment outcome and that asset selection accounts for 10%. In the complex case of multiple accounts, the investment structure is expected to be an even more critical decision.

Once the investment structure is fixed, the next most important determinant of success is proper tax management. The elements of proper tax management are locating asset classes within the investment structure in a tax conscious manner, selecting tax efficient assets for taxable accounts, diligently harvesting tax losses, being slow to realize capital gains, and adjusting portfolio exposures in tax efficient manner (e.g., purchase of a hedge rather than sale of a highly appreciated long.)

The third determinant of investment success is careful asset selection. In general, the performance of assets reflects a combination of market factors and asset specific factors. The market wide factors are controlled by the strategic asset allocation, so asset selection focuses mainly on the specific factors. Here the core finding is that markets have grown more efficient with time and that risks of asset specific events have increased. These trends make asset selection an increasingly difficult means by which to add to investment performance. The general conclusion is that diversification needs to be carefully controlled and that actual asset selection is best delegated to specialists (i.e., to fund managers). Research shows, however, that few fund managers persistently add value and that the fees charged on many funds are so high that there is little probability of the managers adding value on an after fee basis. These considerations lead to a fund selection methodology which emphasizes avoiding mistakes as a first order of business and pursuit of performance as a secondary objective. Mistakes to be avoided include funds with poor risk control, funds with high fees and funds which seek excessive active return in more efficient markets.

Despite the significant insight into investment performance uncovered by financial researchers, another line of research—namely behavioral finance—has revealed that the actual practice of retail investors is far from ideal. As a group, retail investors tend to try to reduce risk by sticking to familiar investments. Ironically this leads to an excessive concentration of funds in large firms, heavily promoted investment funds and the stock of one's employer. While time retail investors understand the importance of diversification, they don't know how to evaluate portfolio diversification. As a result, they tend to spread funds among multiple investment vehicles without consideration for whether the vehicles are closely correlated with one another or actually diversified. Retail investors tend also to not understand the implications of taxes for their investments. In general they cull gains too quickly and hold losses too long. Thus they behave as if they believed prices were mean reverting, which is a poor model of reality. Finally, retail investors have difficulty maintaining a consistent investment policy. One common pattern is to begin by taking excessive risk, eventually suffering painful losses and then switching to excessive conservatism. Another pattern is to begin by seeking the advice of an older person whose advice tends to be colored by what is appropriate for that person's circumstances and is thus unsuitable for the advisee's circumstances.

The clear implication of the behavioral finance research is that most retail investors are unable on their own to implement the best practices identified by modern portfolio theory. Hence the need arises for a professional advisor who can implement a well structured investment program on behalf of the advisee. The advisor's effectiveness is enhanced by establishing a trusted relationship with the advisee. This relationship rests on the advisee understanding what the advisor can do for him, finding that service of value and being able to verify that the service was rendered. The advisor must be able to economically deliver the service he has promised to the advisee. In practice, this means that the investment process should be implemented by a well integrated system that is aligned with the advisory service offering. The so-called Wealth Manager System disclosed herein has been specifically designed to support the advisor in building a trusted client relationship through delivery of a best practices investment process.

Understanding the Client's Goals

Fundamental to establishing a trusted relationship is understanding the client's goals. The basic motivation for investing is to generate the funds required to realize future goals. Examples of the goals investors might seek include funding living expenses, educating a child, making a down payment on a house purchase or making some other capital purchase. These are concrete spending goals, as discussed more fully in the prior patent application. Investors may have more general goals. For instance, they may wish to grow wealth so as to better be able to deal with future needs that are not yet specifically determined. Alternately, they may be viewing some of their home equity as a financial reserve that is available to meet future emergencies but which they prefer not to tap.

The Wealth Manager System assumes that the advisory client has several goals and models the priority of goals. The Wealth Manager System represents priorities in terms of three "shopping carts." The first cart holds the essential goals which the client wishes to be nearly certain of accomplishing, such as paying the mortgage and basic living expenses. The second cart holds the target goals which the client plans on accomplishing but on which he could accept some shortfall were untoward events to occur. The third cart holds the more aspirational goals that one expects will only be funded in relatively favorable circumstances. A specific goal might be split across the three carts. For instance, the essential educational goal for a child could be to pay 100% of the costs of a college education in the local state system, while the target priority might extend to the cost at a private institution and an aspirational priority could include financing graduate school, as well.

The basic structure of goals and priorities may thus be captured by a cross-tabulation of the two concepts:

|  | Goal Category | | |
| --- | --- | --- | --- |
|  | Essential Goal | Target | Aspirational |
| Living Expenses | $80,000 per year | $100,000 per year | $125,000 per year |
| Education | 50% college costs starting 2018 | 100% college costs starting 2018 | 100% college costs starting 2018 and 2 years graduate study starting 2022 |
| House | purchase $750,000 home in 2010 | purchase $1,000,000 home in 2010 | purchase $1,250,000 home in 2010 |
| House #2 | none | purchase $500,000 vacation home in 2020 | purchase $750,000 vacation home in 2015 |
| Capital Purchase | provide $50,000 towards wedding in about 2020 | provide $100,000 towards wedding in about 2020 | provide $100,000 towards wedding in about 2020 |

To place goal categories at different times on comparable footing, we would like to value each item on the basis of how much money should be set aside today to fund the goal. In general, goals define cash flows over time. A living expense goal calls for annual expenditures, potentially for the rest of the client's life, escalating through time to deal with inflation. A capital purchase goal, in contrast, calls for a lump sum cash flow at a point in time. To price out accomplishment of goals, we discount to current dollars the expected cash flow that needs to be funded to realize the goal. If the goal is classified as an essential goal then no shortfall can be tolerated. This can be emphasized by discounting the cost of essential goals at a discount rate equal to the rate of return on a portfolio with after tax cash flows that provide the required cash flow with low risk. For target goals, from which some shortfall is permissible, we use as a discount rate the expected return typically of a moderately risky portfolio. For an aspirational goal, where considerable shortfall is permissible, we use the expected return of a fairly aggressive portfolio as the discount rate. With the goals valued in this way the cross-tabulation can now be presented in cost terms:

|  | Goal\Priority | | |
| --- | --- | --- | --- |
|  | Basic | Target | Additional |
| Living Expenses | 2,000,000 | 2,400,000 | 2,760,000 |
| Education | 100,000 | 180,000 | 225,000 |
| House | 675,000 | 875,000 | 1,075,000 |
| House #2 | 0 | 250,000 | 550,000 |
| Capital Purchase | 32,000 | 57,000 | 57,000 |
| Total | 2,807,000 | 3,762,000 | 4,667,000 |

This presentation allows the client to immediately see the investment cost of the different goals. The client can review this summary information and decide whether that resource use aligns with his inner sense of values and whether it accurately articulates the goals of his financial life.

Life goals are not funded exclusively from investments. Clients rely on earnings, equity stored in home, non-financial investments such as rental property and prospective inheritances. The totality of the assets which the client can rely on we term his resources. In general, resources may be valued in one of several ways. Stocks and bonds may be valued using market prices. Real estate value can be estimated using market values. Earnings can be valued on a discounted cash flow basis using a government bond-based discount rate. Where the cash flow continues for life, as for instance with social security benefits, the valuation can be based on the actuarial present value. This measure values the cash flows basically at the cost of a life insurance policy which replicates the stream of cash flows. Whatever the valuation base, only a portion of the full value of the asset is likely to be available to fund goals. For instance, the value of stocks may need to be reduced by the tax on embedded capital gain. The value of earnings should be reduced by the income taxes that will be levied against them and, in certain circumstances, by a reserve for potential reduction in earning capacity. After adjustment, we have the total net value of resources available to the client. These resources will be applied first to paying off any debts the client has and then to funding his goals. We refer to the combination of debts and goals as the claims against the resources. Just as a business's assets and liabilities are gathered together in a balance sheet, so may an individual's resources and claims be pulled together into a statement of resources and claims.

| Resources | | Claims | Additional |
| --- | --- | --- | --- |
| Investments | 545,000 | Mortgage | 324,000 |
| House | 423,000 | Essential Goals | 3,299,000 |
| Human Capital | 2,302,000 | Supplemental Goals | 1,136,000 |
| Social Security Benefits | 218,000 | Aspirational Goals | 831,000 |
| Total | 3,493,000 | | 5,590,000 |

The prior "Simulation of Portfolio" application discusses the statement of resources and claims at length.

Figure 17:
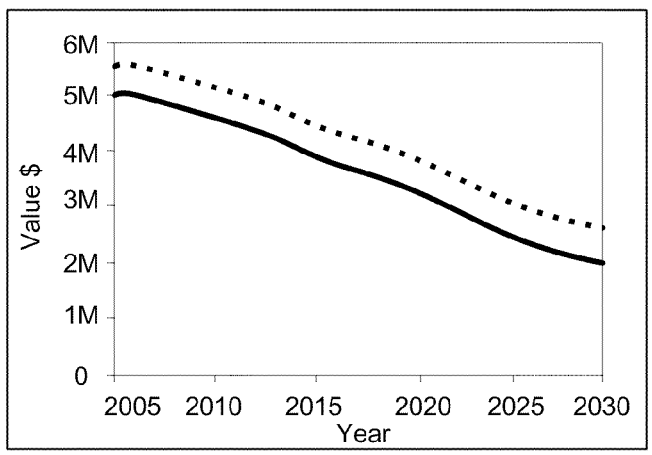
FIGS. 17-18 graph a margin of safety analysis.
Figure 18:
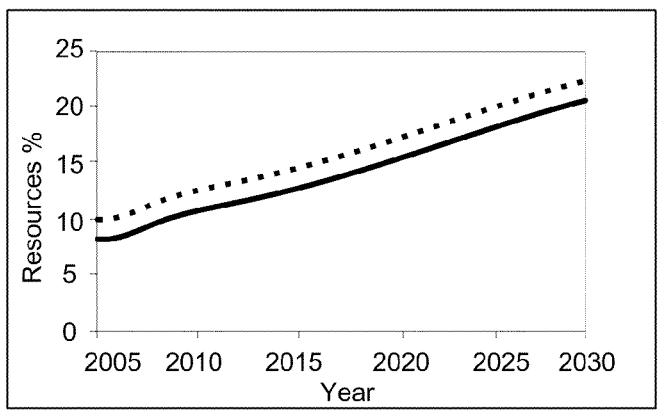
Figure 19:
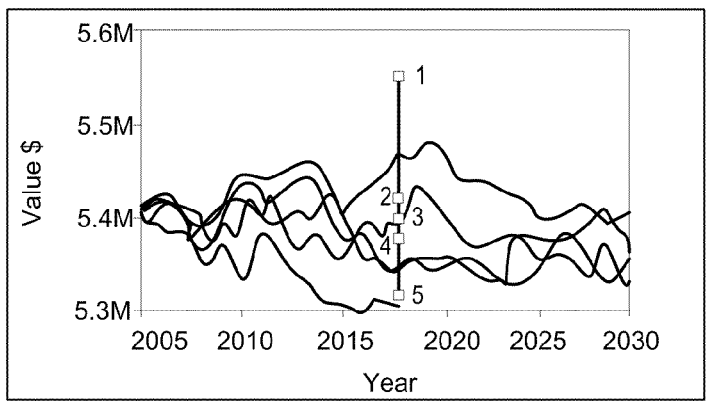
FIG. 19 labels the paths from fortunate to unfortunate, based on either a current progress or a projected outcome at the end of the planning horizon.
Figure 20:
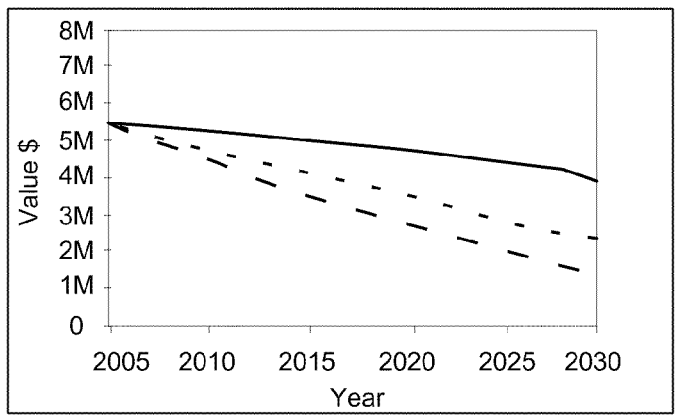
FIG. 20 normalizes the fortunate to unfortunate trajectories.

Considerable insight into the individual's financial life can be gleaned from the statement of resources and claims. FIG. 14 provides a more extensive sample of a statement of resources and claims. Two of the most interesting performance measures are the funding ratio and margin of safety, depicted in FIGS. 17 and 18. The funding ratio is what percentage of a goal priority class is funded by available resources, assuming all higher priority claims are funded first. It gives a measure of to what extent the client will be able to achieve the goals in the priority class, in a particular column of the table above. The margin of safety shows what percentage reduction in resources could be absorbed while still leaving a priority class (and all higher priorities) fully funded. It shows the impact of potential losses on the client's life goals and it provides basic guidance on the client's financial capacity to bear risk. From the statement above we calculate:

| Priority Class | Funding Ratio | Margin of Safety |
| --- | --- | --- |
| Liabilities | 100% | 90% |
| Basic Goals | 66% | 0% |
| Target Goals | 31% | 0% |
| Additional Goals | 0% | 0% |

The statement of resources and claims shows the client's sources of wealth and how he intends to apply that wealth. It gives a basic measure of what he can afford. However, it does not show what he can finance. Accordingly, we have developed a lifetime projection of cash flows to better understand the client's circumstances. This projection is made using an optimization algorithm that plans the sequence of saving and expenditure actions to maximize lifetime goal achievement. The strategy that it develops shows us the extent to which the current resources will generate the cash required to fund planned expenditures. When a client has adequate wealth to fund a goal but the timing of cash flows is such that he cannot finance it, one possible action is to borrow the necessary funds. Another possible action is to trim or postpone the goal. Since the system has no information regarding the availability of borrowing, it focuses on trimming and postponing goal satisfaction as a means to balance resources and claims.

Developing a Strategy

The advisor's objective is to formulate an investment strategy for meeting those cash flows that achieve goals, keeping in mind the risks of investment and managing those risks consistent with the investor's goal structure.

From portfolio theory we know that one of the critical decisions to take is the level of risk to be borne in the portfolio. At a deeper level, we know that risk arises from economic exposures and so the question is truly which exposures to bear and in what degree.

Several considerations bear on the level of risk. These include:
1. The client's financial capacity to bear risk
2. The reward to bearing risk
3. The client's willingness to bear risk
4. The advisor's assessment of the client's investment maturity Clearly one would never want to expose a client to more risk than they have the capacity to carry. The margin of safety tells us what the impact of losses on the client's life goals will be and thus gives us a strongly grounded assessment of the client's capacity to bear risk. The rewards to bearing risk are primarily a function of the returns available in the capital market. Clearly it doesn't make sense to bear incremental risks which do not generate a meaningful increment in return. The assessment of capacity to bear risk and the available risk return tradeoff lead to an objective assessment of what risk is suitable for the client. This objective assessment is then colored by two more subjective factors.

The client's willingness to bear risk is a purely psychological factor which traditionally is evaluated through a questionnaire. In addition, the advisor needs to assess the client's investment maturity. Until the client has been through a full market cycle, the client's self-reported willingness to bear risk should be treated with caution. Assessment of investment experience is typically included in a client questionnaire. Where the advisor has been able to establish a trusted relationship with the client, where the client has built up some investment experience and where the advisor has been able to educate the client about his capacity to bear risk and the reward structure for so doing, one would expect these psychological factors to be relatively unimportant. After psychological factors are tempered by experience and education, the risk that is suitable to the client should be close to that recommended by the objective assessment. Where the client has limited experience, has not yet built a trusted relationship with the advisor or just does not understand investing, the subjective factors are of greater importance and may control the decision as to what represents a suitable risk.

Risk arises from exposures and so it is important to understand the exposures in the client's non-investment portfolio, so that the exposures in the investment part can be chosen in a diversifying manner. On the claim side of the statement of resources and claims, some claims will be fixed in dollar terms whereas other claims are fixed in purchasing power terms. Explicit debts, such as home mortgages, are fixed in dollar terms. A goal to maintain a certain level of living expenses, however, is better seen as fixed in purchasing power terms. On the resource side of the statement, some assets track inflation well whereas others do not. Earning power and house prices tend to increase with the general price level. Social security benefits and CPI-linked bonds are explicitly linked to the general price level. Most insurance benefits and bonds, however, are fixed in dollar terms rather than purchasing power terms. There is also exposure to the business cycle. Most obviously, this exposure comes through the stock portion of the portfolio, but earnings also may carry business cycle exposure. This is particularly the case in jobs where bonus or commissions are a significant part of compensation or where layoffs are a real possibility. Business cycle exposure is much less in stable jobs that have little variable component of compensation, such as in government service, teaching, and clerical jobs.

Many of the risk exposures in the client's life are fixed. The exposures that are inherent in his goals are changed only if the goals themselves change. In most cases, non-financial resources also are fixed. Within the investment category, some of the exposures may actively or practically be fixed. For instance, part of the portfolio may not be under the advisor's control, as for example funds held in a 401k plan with a limited range of investments. In other cases, large embedded capital gains may make it disadvantageous to adjust the exposure. To a degree, the fixed exposures will hedge off against one another, as for instance when CPI sensitive resources hedge CPI sensitive claims.

To analyze these effects, we represent the exposures of the client's resources and claims in terms of a factor model. The claims are taken as a benchmark and the fixed resources as locked positions in the portfolio. The efficient frontier (in a Markovitz sense) is then developed by varying the remaining positions in the portfolio. This analysis shows the investment opportunity accessible to the particular client at that point in life. In general, the non-investment portions of the portfolio will evolve over the life span. For instance, the value of earnings decreases as retirement approaches. Accordingly, the investment opportunity also evolves and with it the appropriate portfolio for the client. Because the particular client's non-investment assets are relatively unique, our approach can include development of efficient frontiers for the particular client instead of a generic efficient frontier.

We analyze this situation using a dynamic optimization methodology and a unique problem formulation. We characterize the client's portfolio by its size and risk level. Choice of these parameters to summarize the overall portfolio reduces the optimization problem to a manageable complexity. The client's utility is derived from the three priority classes of claims. The economic environment is characterized by the time varying investment opportunity set. We maximize client utility to arrive at an optimal strategy. The selected strategy gives the risk level to be borne as a function of year, wealth level, and ratios of claims to wealth. Only the risk level for the current period is needed in the subsequent stage of analysis. By choosing the risk level dynamically, we ensure a consistent trade-off between consumption and investment risk-taking bearing in mind the inter-temporal tradeoffs in utility.

Having derived the recommended risk level for the current period, we compare it to the results of the risk questionnaire and optionally select the lesser of the two recommendations. When the questionnaire governs, this reflects a judgment that subjective factors are controlling for this client, even if the self-selected strategy risk level selected by the objective analysis is riskier.

Building Portfolios

With the strategic picture in focus, we move to tactical implementation. Here the first step is to evaluate near term liquidity needs. One design objective of the system is to keep it focused on investment management and not get intimately involved in banking type activity. Accordingly, we assess the cash outflows required from the portfolio over the next quarter and move those funds to cash assets immediately. To fund cash withdrawals over the next few quarters, we move an optimal portion of the required funding to near cash assets (e.g., certificates of deposit or short term bond funds.) In this way, we setup a ladder of assets for providing the near term liquidity required from the portfolio. By implication, the remaining portion of the portfolio may be managed to a medium to long term investment horizon.

The next step is to build a strategic asset allocation and location plan for the portfolio. This analysis jointly solves for how much of each asset class to hold and in which accounts to locate the holdings. The analytic method is a mean variance optimization in which the investment universe consists of asset classes. The result of this analysis is a strategic asset allocation for each account.

In the third step we consider each account in turn. Our first action is to select a set of potential asset holdings for that account. This selection may take into account a number of factors.

One requirement is that a selected asset be available for purchase. For instance, a mutual fund needs to be open for new investment. In addition, the fund should meet the advisors quality criteria or be grandfathered in by virtue of an existing holding in the client's portfolio. Finally, among the eligible funds, we select the cheapest share classes to own. Once an eligible list of investments has been built we use a mean-variance optimization to complete the portfolio construction. This optimization takes the strategic asset allocation for the account as its benchmark for risk measurement. The return assumption is the pre-tax return in accounts not subject to current taxation and the post-tax return in accounts taxed currently. In both cases, the cost of transacting is taken as a reduction in the utility. Several investment policies may be imposed. Some policies may be set at the advisor level to enforce prudential good practices (e.g., limiting excessive asset class tilts.) Other policies may reflect client requirements such as a trading restriction on an asset. For instance, a client who is a corporate insider will be subject to black out periods on trading around financial release dates. After the optimization completes, the calculated results are cleaned up to eliminate de minims asset holdings and to round trade sizes. This results in a trade list for each account showing the trades required to implement the overall strategy.

Our Method of Developing a Control Strategy

Figure 9:
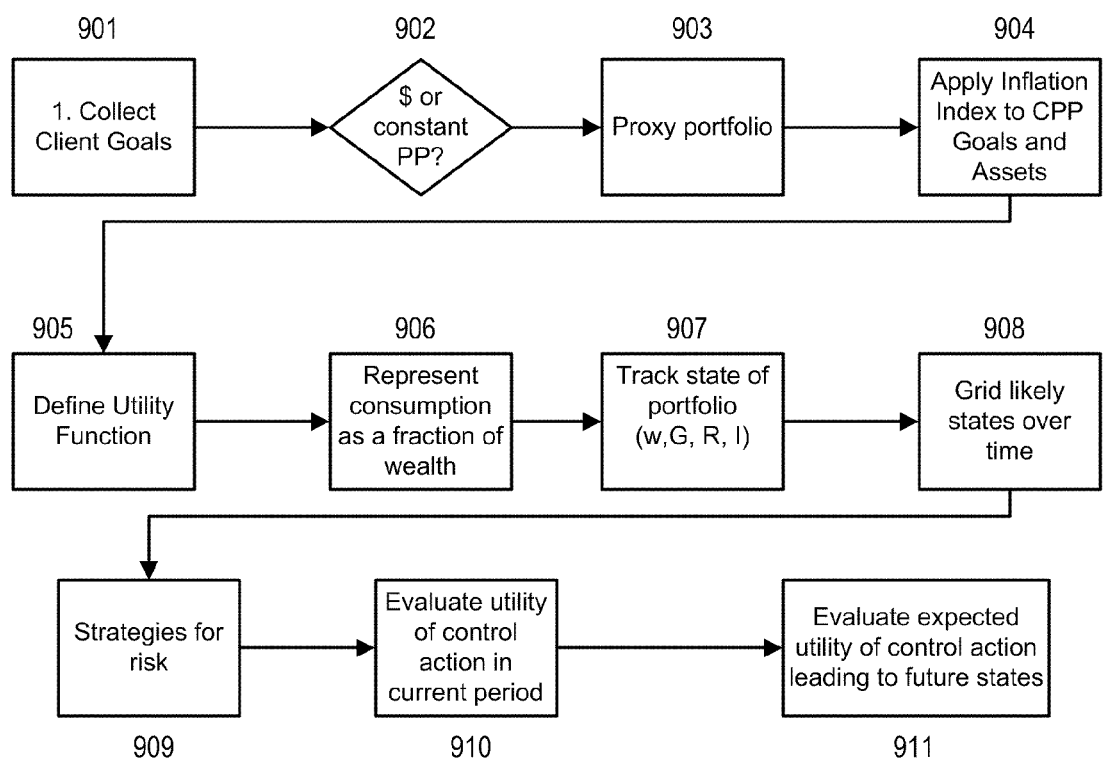
FIG. 9 depicts aspects of the method of developing a control strategy.

FIG. 9 depicts aspects of the method described in this section. First, a computerized system collects client-defined goals (901). Each goal reduces to a sequence of cash flows "F( )" through time of form:

$F(g,n,p)$=desired spending for goal $g$ in year $n$ at priority level $p$

A flow may be denominated in either dollars or dollars of constant purchasing power (902). By convention goals are labeled 0, 1 or 2, with p=0 for priorities which are considered essential to fund, p=1 for priorities we strongly wish to accomplish and p=2 for less important priorities.

Example

The client has three goals: First, to pay the mortgage. This requires $60,000/year for fifteen years and is denominated in dollars (as opposed to constant purchasing power (essential) dollars), so $F(1, n, p) = 60,000$ for $n = 1 \ldots 15$ and $p = 0$ $= 0$ for $n > 15$ or $p > 0$ A second goal is to have funds to pay living expenses. These expenses increase with inflation so the goal is expressed in constant purchasing power. Essential expenses are projected to be at least 60,000 dollars a year to cover and $80,000 is preferred. These funds should extend to my expected lifespan (say 45 years) so $F(2,n,0)$=60,000 for $n$<45

$F(2,n,1)$=20,000 for $n$<45

Note that in this example the living expenses are fixed, but they could just as well fluctuate through time.

A third goal is to purchase an annuity that will continue to pay living expenses should the client outlive their estimated life span. The estimated cost of such an annuity is 80,000, in this example, denominated in dollars of constant purchasing power, so $F(3,45,0)$=80,000

Preferably, we determine a portfolio of bonds that would produce cash flows that satisfy the goals (903). It is not necessary that the portfolio include actual bonds that can be purchased in the market. Standardized bonds can be used. This allows us to construct an economic model that estimates both expected returns and covariance of the bond-covered expenses with assets. In general, this is done by basing an estimate on similar bonds which are present in the market place and making the necessary adjustments to move from the observed bonds to the standardized bonds.

Example

The cash flows from F(1,n,0) for the fifteen year mortgage liability can be modeled by a portfolio of zero coupon government bonds with face amounts of 60,000 maturing in years 1 through 15.

In addition to liabilities and goals, the client will typically have investment and non-investment assets. We collect the data on both types of assets. Preferably, we proxy non-investment assets to investment assets with similar properties (512).

Example

The client has 500,000 in securities, he has earned 20,000 in annual social security benefits that will be paid commencing in 10 years and he plans on selling his home in 15 years and moving to a condo, thus freeing up 300,000 of cash.

The social security benefits and house sales both generate cash flows whose amount increase in line with the CPI index. They can be proxied by positions in CPI-linked bonds which produce the same cash flows.

The client may be restricted in liquidation of some investment assets.

Example

The client has 200,000 in an employer sponsored 401k fund. It can only invest in 5 specific mutual funds. The client has 50,000 in the stock of his employer which he cannot sell for 3 years. The client has adopted a policy that when he invests in equities no more than 20% of the equity investment will be placed in small cap stocks.

Figures 10, 11:
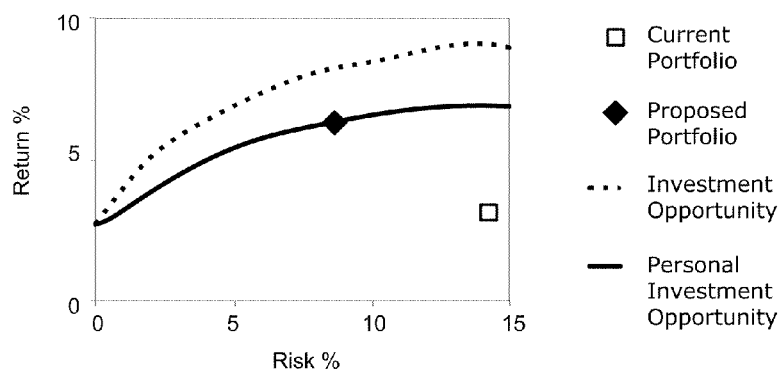
FIG. 10 depicts risk and reward relationships for a personal investment opportunity and the general investment opportunity.
FIG. 11 gives some illustrative data regarding covariance ratios that go into exercising the Markovitz method or any similar analysis of risk and reward.
Figure 12:
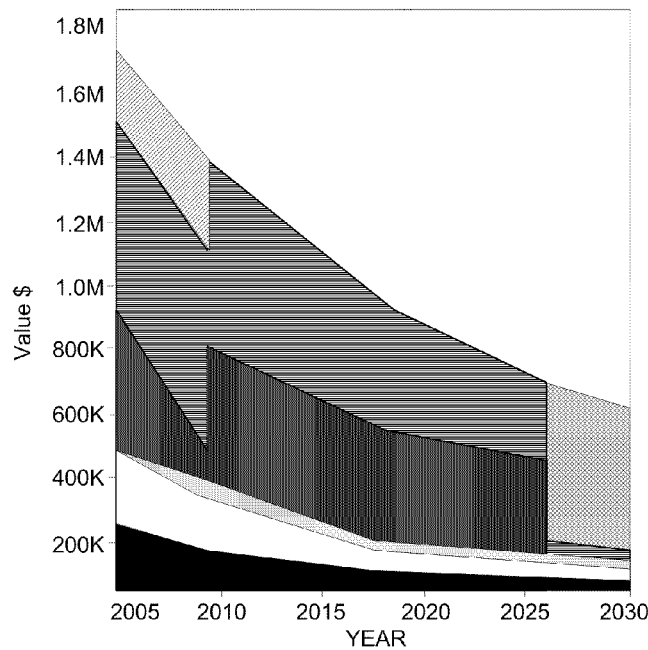
FIG. 12 illustrates a hypothetical change in the mix of investment and non-investment assets for a period beginning with retirement.

Preferably, we analyze the scenario as the client holding a portfolio which has a short position in the bonds that represent his goals and a long position in his assets. The data on this portfolio is assembled into the form required by the Markowitz or an equivalent method. The Markowitz method is applied to determine the efficient frontier, taking into account properties of assets and claims including non-investment assets. FIG. 10, which was discussed in the prior application, depicts investment opportunities and personal investment opportunity as a trade-off between percent annual return and percent value-at-risk per annum. FIG. 11 gives some illustrative data regarding covariance ratios that go into exercising the Markowitz method or any similar analysis of risk and reward. FIG. 12, for a period beginning with retirement, illustrates a hypothetical change in the mix of investment and non-investment assets. As illustrated, the changes can be dramatic, especially at the transition into retirement. If some of the data entering the problem changes through time, such as employment income, then the Markowitz method is applied to determine efficient frontiers for each time point. Efficient portfolio data could be tabulated as $E(t,r)$=expected return at time $t$ for a given risk level $r$ $D(t,r,i)$=fraction of portfolio wealth invested in asset $i$ for the portfolio selected by the Markowitz method with risk $r$ at time $t$ By comparing $D(t,r\_1,i)$ and $D(t+1,r\_2,i)$, we can see the portfolio changes required to go from risk level $r\_1$ at time $t$ to risk level $r\_2$ at time $t+1$. These changes will involve costs in the form of brokerage commissions and taxes on realized capital gains. We can calculate these costs as $K(g,t,r\_1,r\_2)$=cost of going from risk level $r\_1$ at time $t$ to risk level $r\_2$ at time $t+1$ given unrealized capital gains g in the portfolio at time $t+1$ just prior to making the portfolio adjustment.

Constant purchasing power goals and resources at future dates are adjusted by one or more inflation indexes (904). (As we explained in the prior application, an educational cost index may rise more quickly than the consumer price index, so it may be useful to have more than one inflation index.) Suppose the inflation index at time t is I(t). We can convert goals denominated in dollars of constant purchasing power to actual dollars by multiplying by $I(t)/I(0)$. Then for each priority class we can sum over the goals to find the total desired spending at that time. Let $S(t,X,p)$=total desired spending at time $t$ in dollars given $I(t)/I(0)$=$X$, for priority level $p$ Let $CS(t,X,p)$=$S(t,X,0)$+$S(t,X,1)$+ ... +$S(t,X,p)$ be the cumulative spending required by priority class p and all higher priority classes.

Example

For the combined mortgage plus essential and preferred living expenses example given above, with inflation-adjusted "X" applied to constant purchasing living expense amounts, $S(t, X, 0) = 60,000 + 60,000X$    for $t < 15$ $S(t, X, 0) = 60,000X$    for $15 <= t < 45$ $S(45, X, 0) = 80,000X$    at $t = 45$ $S(t, X, 1) = 20,000X$    for $t < 45$ $CS(t, X, 0) = S(t, X, 0)$    definition of cumulative spending by priority $CS(t, X, 1) = 60,000 + 80,000X$    for $t < 15$ $= 80,000X$    for $15 <= t <= 45$ Let $U(t,X,Y)$ denote the utility of spending Y dollars to satisfy goals in time t, given $I(t)/I(0)$=$X$. We may define $U(\ )$ in any reasonable way (905). For two utility classes, a reasonable choice may be $$U(t, X(t), Y) \begin{cases} -\infty \\ \log(Y - CS(t, X(t), 0)) - \log(CS(t, X(t), 1)) \\ \log(Y) \end{cases}$$

This utility function is intended to express the idea that $S(t, X, 0)$ is a minimum spending level that must be met and that spending above $CS(t,X,1)$ brings limited rewards. Example 1: Suppose $X(t)$=2 and CS $(t,X,0)$=20,000X=40,000. Also let CS $(t,X,1)$=80000X=160000. Then Example 2

Suppose instead $X(t)$=2 and $CS(t,X(t),0)$=$CS(t,X(t),1)$=0. Then $U(t,2,20000)$=9.9

$U(t,2,80000)$=11.28

$U(t,2,250000)$=12.43

Here we observe that if $U(\ )$ is a utility function, a>0 is a constant and b is a constant then $U'$=$aU$+$b$ is a utility function also and both U and U' lead to the same investment decision.

Figure 13A:
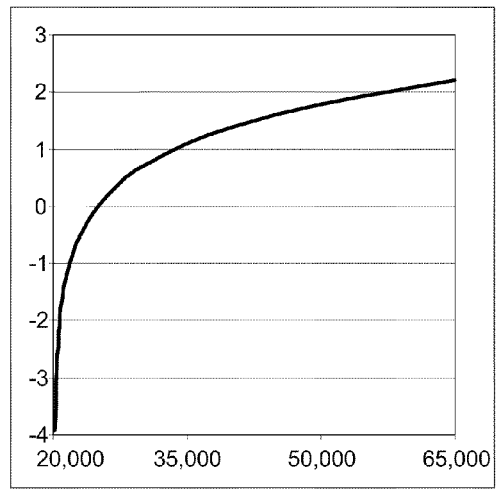
FIGS. 13A and B depict utility curves.
Figure 13B:
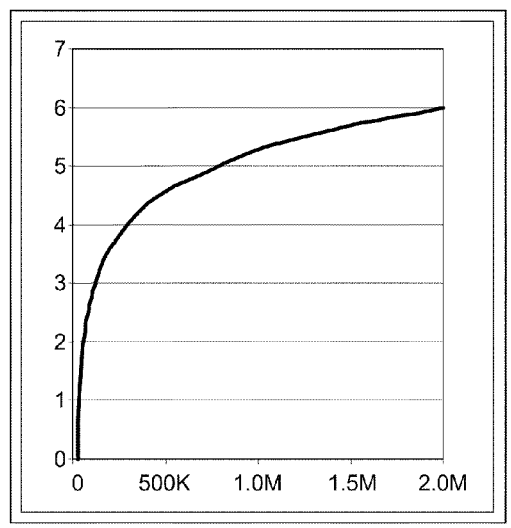

FIGS. 13A and 13B depict examples of logarithmic utility functions, not keyed to these examples, but generally making the utility of only barely achieving (or missing) an essential goal so negative as to be prohibitive, even in a multi-year summation of utility. Of course, other forms of utility function can be applied. A range of utility functions discussed in Kenny, R. and H. Raiffa, *Decisions with Multiple Objectives* (Wiley, New York: 1976), some of which are tabulated on p. 173 and others of which are illustrated on page 254. The chapters of Kenny that include the tabulation and illustration, chapters 4-5, are hereby incorporated by reference. The form of utility function selected may influence the strategy selected.

When addressing retirement planning, it may be prudent to evaluate utility over time without discounting. Even a low discounting rate may sacrifice financial security in old age in favor of immediate consumption. Of course, discounting factors may be applied to utility over time, but we urge caution especially over a 30-50 year planning horizon.

Suppose W(t) is our wealth at time t and we choose to spend a fraction f(t) of it (906). Then the utility of the sequence of decisions $\{f(1), f(2) \ldots \}$ given inflation indexes $\{I(1), I(2), \ldots \}$ is $U(\{f\},\{I\},\{W\})$=sum$\_tU(t,I(t)/I(0),f(t)W(t))$ At a given point in time t we are interested in the following variables (907)

W(t)=our wealth at time t

G(t)=the embedded unrealized capital gain

R(t)=the risk we have chosen to bear at time t

I(t)=the inflation index at time t

We consider these variables as defining the state of our world. We grid each dimension of the world (908) in a reasonable way so that we reduce to considering a finite number of possible states. FIG. 5 graphically depicts a two-dimensional grid, as might be applied to wealth 512 over time 511. Note that the grid need not be rectangular. An initial search grid may be used initially and a refined search grid with more resolution and a narrower range may be used to refine the search.

Example

Our wealth is somewhere between 0 and 1,000,000 so we grid W as at the points $1.2^n \cdot 1000$ for $n=1 \ldots 38$. The unrealized gain is somewhere between 0 and 100% so grid points at 0, 10%, 20% ... 100% are reasonable. The risk is somewhere between 0 and 25%, so grid points at 0%, 1%, ..., 25% are reasonable. The inflation index at time t is somewhere between $I(0)$ and $1.1^n \cdot I(0)$ so we set grid points at $(1+x)^t \cdot I(0)$ for $x=0, 0.01, 0.02 \ldots, 0.1$. Thus the point $(n\_1, n\_2, n\_3, n\_4)$ corresponds to the (W,g,r,I) values as $(1.2^{n\_1} \cdot 1000, n\_2/10, n\_3/100, (1+(n\_4/100)^t \cdot I(0))$ for $n\_1$ in $1 \ldots 38$, $n\_2$ in $0 \ldots 10$, $n\_3$ in $0 \ldots 25$ and $n\_4$ in $0 \ldots 10$. The grid results in a world with 95,000 (=38×25×10×10) possible states.

This particular illustration of gridding is not especially efficient. A more efficient gridding would reduce the number of points without reducing the accuracy of the calculation and thus reduce the total computation time required to reach a given level of accuracy.

Our planning server 714 and the control action recommendation module 823 utilize the portfolio, goal and market information to develop a recommended strategy (909). Dynamic optimization problems are often solved using Bellman's algorithm, which is further discussed below. To apply Bellman's algorithm, let $p\_1$ and $p\_2$ be two points in our girded state space. Using our asset return model we may calculate $P(p\_1, p\_2, t, s)$=probability we are in state $p\_2$ at time $t+1$ given that we were in state $p\_1$ at time $t$ and spent fraction s of wealth at time t.

Example

Suppose we are at $p\_1$. This implies we took risk $r\_1$. Let $r\_2$ be the risk at time $t+1$ implied by $p\_2$. Let g be the embedded gain implied by $p\_2$. We spend $s \cdot W(t)$ and incur costs $K(t, r\_1, r\_2, g) W(t)$. Thus we have a net amount $x=[1-s-K(t,r\_1,r\_2,g)]W(t)$ to invest. Hence the investment return required to reach $W(t+1)$ is $\ln(W(t+1)/x)$. The probability of achieving this return is given by the normal probability $P(\ln(W(t+1), E(t, r\_1), r\_1)$ where $P(x, m, s)$ is the probability of getting value x from the $N(m, s^2)$. The probability of a certain transition in the other coordinates is calculated similarly.

We define a function $J(t, p, s)$ as the value or utility of being in state p at time t and choosing to spend fraction s. Let $s(p,t)$ be the best amount to spend at time t given we are in state p. These functions are defined by a backwards recursion: Let $J(T, p, s) = U(T, I(p), sW(p))$ and $s(p, T) = 1 \ldots$ Suppose $J(t, p, s)$ and $s(p, t)$ are defined then define $J(t-1, p, s)$ and $s(p, t-1)$ as follows:

find s to maximize sum_p2 $P(p, p\_2, t-1, s) J(t, p\_2, s(p\_2, t))$ then $s(p, t-1)$ is the value of s found and $J(t-1, p, s)$ is the maximized value.

After gridding the state space and evaluating alternative strategies, we have for all t and p, $C^*(t,p)$=optimal fraction to consume at time $t$ given $P(t)=p$ $R^*(t,p)$=optimal investment risk to take at time $t$ given $P(t)=p$ In particular, taking t=now and p=current state we have the recommended consumption and risk in the current period (910). Subtract cash consumed from non-investment cash inflows in the current period. The result, if positive, is cash contribution to the portfolio (i.e. saving). The result, if negative, is cash withdrawal from the portfolio. Next perform the Markowitz portfolio construction to match the recommended risk budget, the planned cash contribution or withdrawal and the limit on transaction costs. The result is the optimal portfolio consistent with the long term strategy.

If desired, we may simulate forward in time applying the optimal strategy defined above. The result is the range of outcomes from following the strategy (911).

Our System for Determining a Control Strategy

1.0 Introduction

In this section, we describe a strategy creation module operating on a planning server (714). This module may be invoked after cash flow planning and before portfolio construction. Our approach builds on asset liability management. In one embodiment, the analysis is performed at the asset class level. The claims define an investment benchmark. Locked resources (which include all non-investment resources) constitute a fixed part of the resource allocation. The unlocked resources are varied among investible assets to determine an efficient frontier, which we term the "investment opportunity". Based on the investment opportunity and ratio of wealth to goals, we pick a risk budget. Then we select from the investment frontier the portfolio with that risk budget. The portfolio expressed by the efficient frontier is defined over all resources. We select the sub portfolio of investment resources and map that into the account structure to determine asset class allocations for each account.

When multiple funding pools are present, we adjust the various components of the analysis to reflect the overall pool structure. Any residual value in segregated pools may be flowed to personal pools. The personal pools and household pools are managed on an aggregated basis reflecting the current funding of claims by the different pools. We assume that a wealth building goal has been adjoined to the problem if necessary so that resources never exceed funded claims, and some utility results from wealth accumulation.

Our method includes:

Data assembly: Data from the case, economic database, advisor database and prior analysis is collected and transformed to required form. Some of the data is time varying. This data is summarized as a current value and a long term mean.

Investment opportunity: We set up a portfolio construction problem and solve it for two risk aversions. These risk aversions determine two ends of the efficient frontier and thus define the investment opportunity set. The analysis is performed at least once for current conditions and once for the long term mean condition. As current creditors evolve, the immediate investment opportunity may be revised.

Strategy lookup: We search a table of results from the offline dynamic optimizer to get the risk budget. This search is based on the two investment opportunities and the current ratio of wealth to goal cost.

Pool level investment structure: We determine the investment structure at the pool level. This repeats the investment opportunity optimization with adjustment of the risk aversion to match the risk budget fixed by strategy lookup.

Account level investment structure: Results are translated to the account level and the datacubes required by the next stage of advice creation (i.e., portfolio construction) are created.

2.0 Data Inputs

We begin by describing data which supports our method.

2.1 Prior Analysis

Figure 15:
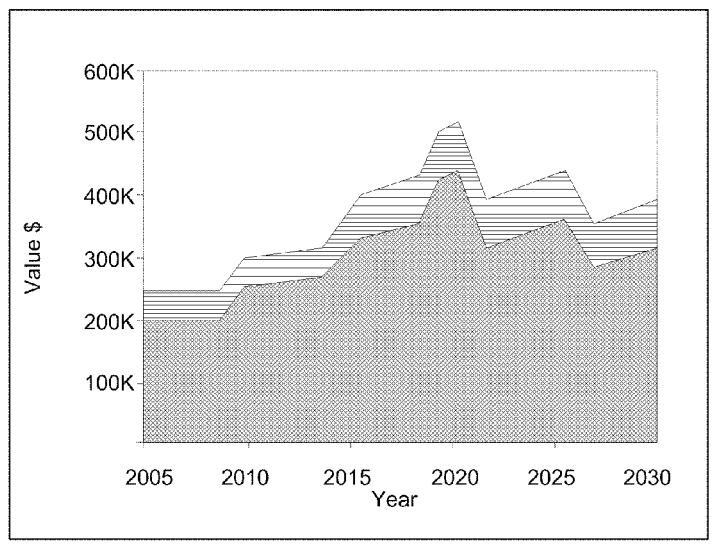
FIG. 15 illustrates a graph of claims and a cash flow summary that may be useful in balancing goals.
Figure 16:
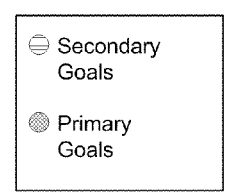
FIG. 16 depicts two major adjustments in asset allocation along a normal economic trajectory through the course of life.

Clients describe their resources and claims, typically in response to a structured interview. The asset descriptions were described at length in the prior application. The resources and claims are balanced, sometimes iteratively, to present a feasible problem, in which resources are sufficient to meet at least essential needs. FIG. 15 illustrates a graph of claims and a cash flow summary that may be useful in balancing goals. Various datacubes are prepared.

2.1.1 Cash Flow Projections Datacube

This datacube holds the cash flows projected by a cash flow manager module.

| Field | Type | Contents |
|---|---|---|
| † family | id | family id |
| † entity | date | entity id |
| † strategy | id | strategy id |
| † scenario | id | scenario id |
| † account | id | account id |
| † year | int | year (current = 0) |
| start_value | currency | starting value |
| flow | currency | net flow |
| basis | currency | tax basis |
| end_value | currency | ending value |

2.2 Advisor Database
2.2.1 Data Tables
Alpha Forecast Sets Table

This table assigns an owner to a set of alpha forecasts. An owner may be the software creator, an enterprise, business unit, advisor or case. Ownership determines edit privileges to this data. By default, the data can only be viewed by the owner and organizational subordinates of the owner.

| Field | Type | Contents |
|---|---|---|
| † forecast_set | id | identifies the set of forecasts |
| owner | id | who can edit the data |

Alpha Forecasts Table

This table holds expected returns for several tax bands.

| Field | Type | Contents |
|---|---|---|
| † forecast_set | id | identifies the set of forecasts |
| † date | date | data date |
| † asset | id | asset id |
| order | int | index assigned to asset |
| exempt_alpha | percent | expected pre tax return in annual percent |
| low_alpha | percent | expected low tax rate return in annual percent |
| medium_alpha | percent | expected medium tax rate return in annual percent |
| high_alpha | percent | expected high tax rate return in annual percent |

2.2.2 Data Interface

The CaseDao (data access object) should support the following methods.

strategy( ) Returns the strategy id applicable to this case. Defaults to cfls1 for October 2007 release.

alphas(rate) Returns a vector of expected returns for the case for supplied tax rate band. Defaults to the strategy set for the October 2007 release. Possible values of rate include EXEMPT, LOW, MEDIUM, HIGH.

has_risk_questionaire( ) returns true if there is a risk questionnaire.

risk_limitation( ) returns true if risk questionnaire imposes a limitation questionnaire_limit_loss( ) returns true if questionnaire limits loss and false if it limits volatility questionnaire_limit( ) limit supplied by the questionnaire 2.3 Economic Database
2.3.1. Data Feed
Tax Band Table This table maps income level and marital status to a tax band.

| Field | Type | Contents |
|---|---|---|
| † strategy | id | strategy id |
| † date | date | data date |
| † status | code | marital status |
| † income | currency | maximum income for band |
| band | code | tax band |

Typical values of band are EXEMPT, LOW, MEDIUM, HIGH.

Strategy Parameters Table

The system is built to be adaptable as systems and computational precision evolve. This table holds miscellaneous parameters required to implement a strategy.

| Field | Type | Contents |
|---|---|---|
| † strategy | id | strategy id |
| † date | date | data date |
| risk_infinity | float | risk aversion considered infinite $\infty_{risk}$ |
| risk_scaling | float | Risk scaling factor $c_1$ |
| return_scaling | float | return scaling factor $c_2$ |
| wealth_ratio | float | wealth ratio scaling factor $c_3$ |
| maximum_iterations | int | maximum number of iterations in the QP solver |
| stop_criterion | float | convergence test in QP solver |
| ops_infinity | float | value representing infinity in optimizer $\infty_{ops}$ |

Strategy Policies Table

This table holds the investment policies associated to a policy.

| Field | Type | Nullable | Contents |
|---|---|---|---|
| † strategy | id | | strategy id |
| † date | date | | data date |
| † type | id | | policy type |
| id | string | yes | identifier field |
| flag | Boolean | yes | Boolean field |
| value1 | float | yes | first value field |
| value2 | float | yes | second value field |
| value3 | float | yes | third value field |

Asset Style Associations Table

So-called asset styles associate friendly names with generic assets that have cryptic, analytical-sounding names. This table holds an association between style identifiers and generic assets.

| Field      | Type | Contents    |
|------------|------|-------------|
| † strategy | id   | strategy id |
| † date     | date | data date   |
| † style    | id   | style id    |
| asset      | id   | asset id    |

Asset Properties Table

This table holds properties of the generic assets referenced by the asset style association table, including user-established bounds on concentration of the portfolio in these assets.

| Field             | Type    | Nullable | Contents                                                                                                  |
|-------------------|---------|----------|-----------------------------------------------------------------------------------------------------------|
| † strategy        | id      |          | Strategy id                                                                                               |
| † date            | date    |          | data date                                                                                                 |
| † asset           | id      |          | asset id                                                                                                  |
| order             | int     |          | index assigned to asset                                                                                   |
| sheltered         | Boolean |          | true if tax sheltered else false                                                                          |
| investment        | Boolean |          | true if investment asset else false                                                                       |
| liquidity_horizon | int     | yes      | the asset is considered a liquid asset at this horizon (in years), null if not a liquid asset at any horizon |
| lower             | percent | yes      | lower limit on holding                                                                                    |
| upper             | percent | yes      | upper limit on holding                                                                                    |

Asset Covariance Table

This table holds asset by asset covariance values for the generic assets in the asset properties table.

| Field      | Type  | Contents                                        |
|------------|-------|-------------------------------------------------|
| † strategy | id    | strategy id                                     |
| † date     | date  | data date                                       |
| † asset1   | id    | row asset                                       |
| † asset2   | id    | column asset                                    |
| row        | int   | row index                                       |
| column     | int   | column index                                    |
| exempt     | float | covariance in tax exempt case (monthly decimal) |
| low        | float | covariance in low tax rate case (monthly decimal) |
| medium     | float | covariance in medium tax rate case (monthly decimal) |
| high       | float | covariance in high tax rate case (monthly decimal) |

Strategic Opportunity Table

This table maps integer 4-tuples representing two discrete points on a risk-return diagram to an integer code termed the opportunity value. The points on the diagram are taken as extrema of an efficient frontier and the opportunity value identifies the frontier as a member of a set of frontiers.

| Field         | Type | Contents              |
|---------------|------|-----------------------|
| † strategy    | id   | strategy id           |
| † date        | date | data date             |
| † low_risk    | int  | sk coordinate         |
| † low_return  | int  | low return coordinate |
| † high_risk   | int  | high risk coordinate  |
| † high_return | int  | high return coordinate |
| opportunity   | int  | opportunity value     |

Strategic Opportunity Table

This table holds the dynamic strategy.

| Field               | Type    | Contents                            |
|---------------------|---------|-------------------------------------|
| † strategy          | id      | strategy id                         |
| † date              | date    | data date                           |
| † horizon           | int     | investment horizon                  |
| † initial_opportunity | int   | initial opportunity                 |
| † mean_opportunity  | int     | mean long run opportunity           |
| † primary_ratio     | int     | primary wealth ratio $\rho_1$       |
| † secondary_ratio   | int     | primary wealth ratio $\rho_2$       |
| † additional_ratio  | int     | primary wealth ratio $\rho_3$       |
| risk_budget         | percent | risk budget in annual percent       |
| consumption_budget  | percent | consumption budget in annual percent |

2.3.2 Data Interface

The StrategyDao supports the following methods:

constructor(strategy) Constructed with the strategy id. Thereafter returns values pertinent to that strategy.

aversion_infinity Return risk_infinity value from strategy parameter table.

ops_infinity Return optimimizer_infinity value from strategy parameter table.

risk_scaling Return risk_scaling from strategy parameter table.

return_scaling Return return_scaling from strategy parameter table wealth_scaling Return wealth_ratio from strategy parameter table tax_band(income, marital_status) Return tax band for income level (in constant dollars to reflect indexing) and marital status based on tax band table.

policies Return list of investment policies from strategy policies table.

universe Return ordered list of assets in strategic investment universe from asset properties table.

sheltered Return vector of zeros and ones where sheltered assets have a one and unsheltered assets have a zero. Values are set based on asset properties table.

investment Return vector of zeros and ones where investment assets have a one and non-investment assets have a zero. Values are set based on asset properties table.

lower Return vector of lower bound on asset holdings. Values based on asset properties table with null values represent by $-\infty_{ops}$ from strategy parameter table.

upper Return vector of upper bound on asset holdings. Values based on asset properties table with null values represent by $\infty_{ops}$ from strategy parameter table.

covariance(rate) Returns monthly decimal covariance matrix for indicated tax rate opportunity(risk1,alpha1,risk2,alpha2) For integers $0 \leq risk1 \leq risk2$ and $alpha1 \leq alpha2$. Return the opportunity value in the strategy opportunity table. Return exact value if found. Otherwise pull supplied coordinates to boundary of pre-calculation grid and supply corresponding value.

strategy(horizon,initial_opportunity,final_opportunity, primary_ratio,secondary_ratio,additional_ratio) Return the tuple (risk budget,consumption_budget) based on inputs and values in strategy table. Supply exact match if found; otherwise pull to boundary.

3.0 Strategy Optimizer

The strategy optimizer extends the portfolio optimizer by adding a generic capability. It then exercises that capability to implement shelter and cash constraints.

3.1 General Purpose Facility

Suppose n is the number of assets in the investment universe. The optimizer user may supply

- lower A vector L of size m
- upper A vector U of size m
- policy A matrix A of size m×n
- penalty A matrix K of size m×2

Here we assume $L_i \leq U_i$ and $K_{ij} \geq 0$.

Let h represent the holding weights of the optimal portfolio. Let $p^-$ and $p^+$ be auxiliary decision variables of dimension m. Define $$b_i^- = \begin{cases} 0 & \text{if } K_{i0} = 0 \\ \infty_{ops} & \text{if } K_{i0} \neq 0 \end{cases}$$

and $$b_i^+ = \begin{cases} 0 & \text{if } K_{i1} = 0 \\ \infty_{ops} & \text{if } K_{i1} \neq 0 \end{cases}$$

The effect of the supplied data is to add the constraints $$L \leq Ah + p^- - p^+ \leq U$$

$$0 \leq p^- \leq b^-$$

and $$0 \leq p^+ \leq b^+$$

to the problem and the term $$-\sum_i K_{i0} p_i^{-2} + K_{i1} p_i^{+2}$$

to the objective. Note that when $K_{ij}=0$ the corresponding auxiliary variable is effectively eliminated from the problem. An efficient implementation will avoid introducing these phony variables.

3.2 Applications

We make two applications of the general purpose facility.

3.2.1 Shelter Constraint

One use of this functionality is to add a single equality constraint with no penalties. In other words m=1 and K=0 and $L_0=U_0=S$. Thus the supplied data is a vector A of dimension n and a scalar S. We impose the constraint $$Ah=S$$

We refer to this as the shelter constraint. Here $A_i=1$ if asset i is a sheltered asset and $A_i=0$ otherwise. The value S is called the shelter ratio. It is in the interval [0, 1].

3.2.2 Cash Constraints

Here the user provides m≧0 lower bound constraints. Thus the supplied data is L and A. We infer U to have all of its elements equal to $\infty_{ops}$. There are no penalty variables and the constraint is $$L \leq Ah$$

4.0 Data Assembly

4.1 Configuration

From the case data, return the strategy name. We will represent this value by strategy.

4.2. Locked Positions

If an account is managed or advised, determine its locked (non-tradable) positions as follows:

1. Merge the list of global asset locks with the list of account level asset locks. If the locks conflict, take the more restrictive.
2. Scan the merged list. If an asset appears on the list apply that lock to every position in that asset in the account.
3. Finally scan the list of position level locks for the account and apply them. In case of conflict take the more restrictive lock.

The determination of which of two trading restrictions is more restrictive can be made by referencing a look-up in the following table:

| Field | Type | Contents |
|---|---|---|
| † restriction1 | code | first trading restriction |
| † restriction2 | code | second trading restriction |
| final_restriction | code | final trading restriction |

Output the following datacube

Lot Level Lock Detail Datacube The locking status of each lot

| Field | Type | Contents |
|---|---|---|
| † family | id | family id |
| † entity | id | entity id |
| † account | id | account id i |
| † asset | id | asset id j |
| † lot | id | lot id k |
| global_lock | code | global lock |
| account_lock | code | account level lock |
| position_lock | code | position level lock |
| conflict | Boolean | true if there were conflicts in lock setting |
| final_lock | code | final lock value |

4.3 Balance Sheet Projections

Let N be the planning horizon used in the cash flow manager. Let $n_i$=floor(iN/5) for i=0, ..., 4 and $n_5$=N. We tally the estimated value of investment accounts in the years $n_i$ under the plan.

| Field | Type | Contents |
|---|---|---|
| † family | id | family id |
| † entity | id | entity id |
| † account | id | account id i |
| † point | int | i |
| year | int | the value $n_i$ |
| value | currency | planned value of account |
| basis | currency | estimated basis value of the account |

We also tally the estimated balance value in those years of non-investment resources.

| Field | Type | Contents |
|---|---|---|
| † family | id | family id |
| † entity | id | entity id |
| † resource | id | resource id i |
| † point | int | i |
| year | int | the value $n_t$ |
| value | currency | estimated value of the resource |

Finally, we need the estimated balance sheet value (claim, priority class) combination.

| Field | Type | Contents |
|---|---|---|
| † family | id | family id |
| † entity | id | entity id |
| † claim | id | claim id i |
| † priority | id | priority class id |
| † point | int | sequence number j |
| year | int | the value $n_j$ |
| value | currency | estimated value of the claim |

The higher priority class values are incremental values, rather than total values of a claim across priority classes.

This data can be extracted from output of a cash flow manager module. If the output provides values at future points in time, then these values are used. This rule applies to investment accounts and houses. Otherwise, we are provided with the expected cash flows. Examples are human capital, social security and claims. Suppose the expected cash flow at time t for some item is $e_t$. We calculate its balance sheet value at time s as $$v(s) = \sum_{t \geq s} \rho^{t-s} e_t$$

where $\rho$ is the appropriate discount factor, i.e.

$$\rho = \frac{1}{1 + \frac{r}{100}}$$

where r is the discount rate used for valuing this type of flow.

4.4 Tax Bands

Here we describe a streamlined tax treatment that can readily be upgraded. From the cash flow manager, we have the expected human capital contribution in each year HC(t) and the value of each account $V_i(t)$. Sum the values of the individual accounts to get a total V(t). Take into consideration interest flowing from the accounts by setting the estimated taxable income ET(y) equal to $$ET(t) = HC(t) + 0.04 V(t)$$

Define a deflator $D(t) = 1.03^t$ to roughly compensate for tax model indexing. Let $$DET(t) = ET(t)/D(t)$$

Compare DET(0) and marital status against the tax band table to get the current tax band $TB_0$. Take the average $$ADET = \frac{1}{5} \sum_i DET(n_i)$$

and use the averaged deflated estimated taxable income (ADET) and marital status to look up the mean tax band $TB_2$.

4.5 Style Calculation

Here we calculate current styles for resources, claims and locked resources over the different funding pools. In addition, we collect information on taxability and tax basis. This description is calculated at the funding pool level. It can be built up in stages. First, we summarize individual investment accounts. Then, we summarize individual funding pools. Next, we calculate the implicit wealth and claim transfers between pools. Finally, we summarize the pools after taking these transfers into account. We use the following decomposition of balance sheet items:

resources
investment assets
controlled investments
locked controlled investments
unlocked controlled investments
uncontrolled investments
non-investment resources
claims An interesting aggregate is locked resources, which consists of resources subject to an advisor's control, uncontrolled investments and non-investment resources. For investments, we distinguish between tax-sheltered and regular (taxable) assets. We are interested in the aggregate of all taxable and all sheltered investments, regardless of control and locking status. At a pool level, we distinguish between direct resources and claims (due to items in the pool) and indirect resources and claims (due to inter-pool transfers). The aggregate of direct and indirect items is known as full items. We capture these concepts with the following notation:

| | Account level | | Pool level | | | |
|---|---|---|---|---|---|---|
| | | | Direct | | Full | |
| Item | Value | Style | Value | Style | Value | Style |
| Investment | V | X | $\tilde{V}_0$ | $\tilde{X}_0$ | $\hat{V}_0$ | $\hat{X}_0$ |
| Locked investment | V' | X' | $\tilde{V}'_0$ | $\tilde{X}'_0$ | $\hat{V}'_0$ | $\hat{X}'_0$ |
| Unlocked investment | V'' | X'' | $\tilde{V}''_0$ | $\tilde{X}''_0$ | $\hat{V}''_0$ | $\hat{X}''_0$ |
| Controlled investment | W | Y | $\tilde{W}$ | $\tilde{Y}$ | $\hat{W}$ | $\hat{Y}$ |
| Non-investment resource | | | $\tilde{V}_1$ | $\tilde{X}_1$ | $\hat{V}_1$ | $\hat{X}_1$ |
| Resource | | | $\tilde{V}_3$ | $\tilde{X}_3$ | $\hat{V}_3$ | $\hat{X}_3$ |
| Claim | | | $\tilde{V}_2$ | $\tilde{X}_2$ | $\hat{V}_2$ | $\hat{X}_2$ |
| Taxable investment | T | | $\tilde{T}$ | | $\hat{T}$ | |
| Taxable basis | B | | $\tilde{B}$ | | $\hat{B}$ | |
| Locked resource | L | | $\tilde{L}$ | | $\hat{L}$ | |

4.5.1. Investment Accounts

Consider account i at time t=0. For asset j let $s_j$ be its style weights in the strategy calculated style and let $v_j$ be its value. Let $V_i(0)$ be the portfolio base for account i. If account i is either managed or advised and position k is not locked, then set $\chi_k = 0$ Note that there may be multiple positions k for an asset j. Otherwise, set $\chi_k = 1$. Let $\tau_i = 0$ if the account is sheltered from current taxation and $\tau_i = 1$ otherwise. Let $b_k$ be the basis of position k. Define $$V_i'(0) = \sum_k \chi_k v_k \quad \text{locked}$$

$$V_i''(0) = \sum_k (1-\chi_k) v_k \quad \text{unlocked}$$

$j_k = $ the asset $j$ of which lot $k$ is a position $$X = \frac{1}{V_i(0)} \sum_k v_k s_{j_k} \quad \text{investment}$$

$$X' = \frac{1}{V_i(0)} \sum_k \chi_k v_k s_{j_k} \quad \text{locked}$$

$$X'' = X - X' \quad \text{unlocked}$$

$$B_i(0) = \tau_i \sum_k (1-\chi_k) b_k \quad \text{taxable basis}$$

For times t>0 let $V_i(t)$ be the estimated value of the account. Set $V'_i(t)=0$ and $V''_i=V_i(t)$. If the account is taxable, let $B_i(t)$ be the estimated basis of the account from the balance sheet projections. If the account is not taxable let $B_i(t)=0$.

Output the following datacubes:

Account Level Lock Summary Datacube: Summary of locks at the account level.

| Field | Type | Contents |
| --- | --- | --- |
| † family | id | family id |
| † entity | id | entity id |
| † account | id | account id i |
| † time | id | sequence time t |
| controlled | Boolean | true if account is managed or advised |
| sheltered | Boolean | true if sheltered from current taxation |
| value | currency | portfolio base $V_i(t)$ |
| locked_value | currency | part of base locked $V_i'(t)$ |
| unlocked_value | currency | part of value not locked $V_i''(t)$ |
| basis | currency | basis of unlocked taxable positions $B_i(t)$ |

Account Level Style: Summary of styles at the account level.

| Field | Type | Contents |
| --- | --- | --- |
| † family | id | family id |
| † entity | id | entity id |
| † account | id | account id i |
| † strategy | id | strategy id |
| † style | id | style id k |
| full_weight | float | weight on style in strategy1 scheme $X_k$ |
| locked_weight | currency | locked weight on style in strategy1 scheme $X_k'$ |
| unlocked_weight | currency | unlocked weight on style in strategy1 scheme $X_k''$ |

4.5.2 Preliminary Pool Analysis

Next we iterate over the list of funding pools. A funding pool p has attached to it a list $A_p$ of investment accounts, a list $N_p$ of non-investment resources and a list $C_p$ of claims.

For account i let $\tau_i=0$ if the account is sheltered and $\tau_i=1$ otherwise. Let $c_i=1$ if the account is controlled and 0 otherwise. For times t let $B_i(t)$ be the account basis. Define at the pool and account levels:

$$\tilde{V}_0(p,t) = \sum_{i \in A_p} V_i(t) \quad \text{investment value}$$

$$\tilde{V}_0'(p,t) = \sum_{i \in A_p} V_i'(t) \quad \text{locked value}$$

$$\tilde{V}_0''(p,t) = \sum_{i \in A_p} V_i''(t) \quad \text{unlocked value}$$

$$W(p,t) = \sum_{i \in A_p} c_i V_i(t) \quad \text{controlled value}$$

$$T(p,t) = \sum_{i \in A_p} c_i \tau_i V_i(t) \quad \text{taxable status}$$

$$\tilde{B}(p,t) = \sum_{i \in A_p} c_i B_i(t) \quad \text{taxable basis}$$

Also for time t=0 only let $$\tilde{X}_0(p) = \sum_{i \in A_p} V_i(0) X_i$$

$$\tilde{X}_0'(p) = \sum_{i \in A_p} V_i(0) X_i'$$

$$\tilde{X}_0''(p) = \sum_{i \in A_p} V_i(0) X_i''$$

$$Y(p) = \sum_{i \in A_p} c_i V_i(0) X_i$$

Each non-investment resource and claim i supplies a member function strategic_style (strategy) which returns its style vector $x_i$ in the strategy calculated style. For non-investment resource i we also get its fractional membership $f_i$ in the pool and estimated balance sheet value $v_i(t)$ at point t. For a claim i let $w_{ij}(t)$ be the value of the $j^{th}$ priority class at point t. Let $r_j$ be the funding ratio of class j and set $$v_i(t) = \sum_j r_j w_{ij}(t)$$

Define $$\tilde{V}_1(p,t) = \sum_{i \in N_p} f_i v_i(t)$$

$$\tilde{X}_1(p,t) = \sum_{i \in N_p} f_i v_i(t) X_i$$

$$\tilde{V}_2(p,t) = \sum_{i \in C_p} v_i(t)$$

$$\tilde{X}_2(p,t) = \sum_{i \in C_p} v_i(t) X_i$$

For pool p let the total locked resource be $$L(p,t) = \tilde{V}_0'(p,t) + \tilde{V}_1(p,t)$$

Let the total resource be $$W_p(t) = \tilde{V}_0(p,t) + \tilde{V}_1(p,t)$$

and let $$C_p(t) = \tilde{V}_2(p,t)$$

be the claims.

4.5.3 Inter-Pool Transfers

Number the funding pools as follows:

| Number | Pool |
|---|---|
| 0 | household |
| 1 | principal one |
| 2 | principal two |
| n | segregated pool n − 2 |

Let $x_j$ denote the parent of pool j. Thus $x_0$ is undefined, $x_1 = x_2 = 0$ and $x_n = 1$ if segregated pool n−2 is linked to principal one and $x_n = 2$ otherwise. For $i > 2$ let $E_n(t) = \max(0, W_n(t) - C_n(t))$ be the excess value in pool n. For $i = 1, 2$ the residual value of segregated pools available to principal pools is $$R_i(t) = \sum_{n : x_n = i} E_n(t)$$

Then the adjusted principal pool value is $$W'_i(t) = W_i(t) + R_i(t)$$

and its excess value is $$E_i(t) = \max(0, W'_i(t) - C_i(t))$$

Finally the adjusted value of the household pool is $$W'_0(t) = W_0(t) + E_1(t) + E_2(t)$$

Set $$W'_n(t) = W_n(t)$$

for n>2. Then for n>0 let $$\psi_n(t) = E_n(t)/W'_n(t)$$

Define resource transfer coefficients $T_{ij}(t)$ as $$T_{ij}(t) = \begin{cases} W_n(t)/W'_n(t) & \text{if } i = j \\ \psi_i(t) & \text{if } i > 0 \text{ and } j = x_i \\ \psi_i(t)\psi_{x_i}(t) & \text{if } i > 2 \text{ and } j = 0 \\ 0 & \text{otherwise} \end{cases}$$

Similarly for n>0 let $$\phi_n(t) = E_n(t)/W'_{x_n}(t)$$

and define claim transfer coefficients $T'_{ji}(t)$ as $$T'_{ij}(t) = \begin{cases} W_n(t)/W'_n(t) & \text{if } i = j \\ \phi_i(t) & \text{if } i > 0 \text{ and } j = x_i \\ \phi_i(t)\phi_{x_i}(t) & \text{if } i > 2 \text{ and } j = 0 \\ 0 & \text{otherwise} \end{cases}$$

These transfer coefficients describe a flow of resource from child to parent and of claim from parent to child. Output the following datacube:

Pool Transfer Weights Datacube: Basic data on inter-pool transfers.

| Field | Type | Contents |
|---|---|---|
| † family | id | family id |
| † entity | id | entity id |
| † strategy | id | strategy id |
| † pool | id | pool id p |
| † time | int | sequence time t |
| parent | id | id of parent pool (n/a for household) |
| wealth | currency | pool wealth $W_p(t)$ |
| transfer | currency | wealth transfer $E_p(t)$ |
| resource_weight | float | resource transfer weight $\psi_p(t)$ |
| claim_weight | float | claim transfer weight $\phi_p(t)$ |

Pool Transfer Matrix Datacube: Full transfer matrices.

| Field | Type | Contents |
|---|---|---|
| † family | id | family id |
| † entity | id | entity id |
| † strategy | id | strategy id |
| † parent | id | id of parent pool s |
| † child | id | id of child pool s |
| † time | int | sequence time t |
| resource_weight | float | resource transfer weight $T_{sp}(t)$ |
| claim_weight | float | claim transfer weight $T_{ps}'(t)$ |

4.5.4 Pool Summary

Now we consolidate over funding pools. For each pool p and time t define $$\hat{V}_0(p, t) = \sum_{s \geq p} T_{sp}(t) \tilde{V}_0(s, t)$$

$$\hat{V}_0'(p, t) = \sum_{s \geq p} T_{sp}(t) \tilde{V}_0'(s, t)$$

$$\hat{V}_0''(p, t) = \sum_{s \geq p} T_{sp}(t) \tilde{V}_0''(s, t)$$

$$\hat{V}_1(p, t) = \sum_{s \geq p} T_{sp}(t) \tilde{V}_1(s, t)$$

$$\hat{V}_2(p, t) = \sum_{s \leq p} T'_{sp}(t) \tilde{V}_2(s, t)$$

$$\hat{V}_3(p, t) = \hat{V}_0(p, t) + \hat{V}_1(p, t)$$

$$\hat{L}(p, t) = \hat{V}_0'(p, t) + \hat{V}_1(p, t)$$

$$\hat{W}(p, t) = \sum_{s \geq p} T_{sp}(t) W(s, t)$$

$$\hat{T}(p, t) = \sum_{s \geq p} T_{sp}(t) T(s, t)$$

$$\hat{B}(p, t) = \sum_{s \geq p} T_{sp}(t) B(s, t)$$

Output the following datacube:

Pool Summary Datacube: Basic data on pools.

| Field | Type | Contents |
|---|---|---|
| † family | id | family id |
| † entity | id | entity id |
| † pool | id | pool id p |
| † time | int | sequence time t |
| all_resource | float | resource value $\hat{V}_3(p,t)$ |
| all_locked | float | locked resource value $\hat{L}(p,t)$ |
| all_unlocked | float | unlocked resource value $\hat{V}_0''(p,t)$ |
| all_taxable | float | controlled taxable resource value $\hat{T}(p,t)$ |
| all_basis | float | basis of controlled taxable resource $\hat{B}(p,t)$ |
| all_claim | float | claim value $\hat{V}_2(p,t)$ |
| all_net | float | All_resource minus all_claim |
| direct_resource | float | pool direct resource value $W_p(t)$ |
| direct_locked | float | pool direct locked resource value $L(p,t)$ |
| direct_unlocked | float | pool direct unlocked resource value $\hat{V}_0''(p,t)$ |
| direct_taxable | float | pool direct controlled taxable resource value $\hat{T}(p,t)$ |
| direct_basis | float | pool direct basis of controlled taxable resource $\tilde{B}(p,t)$ |
| direct_claim | float | pool direct claim value $C_p(t)$ |
| direct_net | float | direct_resource minus direct_claim |

4.5.5 Time Averaged Pool Summary

We will define time averaged pool value as $$\overline{V}(p) = \sum_{t=1}^{5} \hat{V}_3(t)$$

Define the basis ratio as $$\rho(p,t) = \hat{B}(p,t)/\hat{T}(p,t)$$

if the denominator is non-zero and $\rho(p,t)=0$ otherwise. The time averaged basis ratio $\overline{\rho}$ is defined by $$\overline{T}(p) = \sum_{i=1}^{5} \hat{T}(p,i)$$

$$\overline{\rho}(p) = \frac{1}{\overline{T}(p)} \sum_{i=1}^{5} \hat{T}(p,i)\rho(p,i)$$

and again $\overline{\rho}(p)=0$ if $\overline{T}(p)=0$.

The sheltered ratio is defined as $$s(p,t) = 1 - \frac{\hat{T}(p,t)}{\hat{V}_3(p,t)}$$

and the time averaged shelter ratio as $$\overline{s}(p) = \frac{1}{\overline{V}(p)} \sum_{i=1}^{5} \hat{V}_3(i,t)s(p,i)$$

Output the datacube:

Mean Pool Summary: Time averaged pool parameters.

| Field | Type | Contents |
|---|---|---|
| † family | id | family id |
| † entity | id | entity id |
| † strategy | id | strategy id |
| † pool | id | pool id |
| value | currency | current value $\hat{V}_3(p,0)$ |
| mean_value | currency | mean value $\frac{1}{5}\overline{V}(p)$ |
| taxed_value | currency | current taxed value $\hat{T}(p,0)$ |
| mean_taxed_value | currency | mean taxed value $\frac{1}{5}\overline{T}(p)$ |
| basis_ratio | float | current basis ratio $\rho(p,0)$ |
| mean_basis_ratio | float | mean basis ratio $\overline{\rho}(p)$ |
| shelter_ratio | float | current shelter ratio $s(p,t)$ |
| mean_shelter_ratio | float | mean shelter ratio $\overline{s}(p,t)$ |

4.6 Liquidity Requirement and Characteristics

Define a weight $w_t$ for year t as follows:

| year t | weight $w_t$ |
|---|---|
| 0 | 1 |
| 1 | 0.75 |
| 2 | 0.5 |
| 3 | 0.25 |

Here period 0 corresponds to the current partial year.

For controlled account n let $x_n(t)$ be the planned cash flow for the account in year t (in dollars) from the cash flow plan. The signs are such that negative values correspond to outflows. For pool p let $$y_1(p,t) = \sum_n x_n(t)$$

be the planned flow summed over all controlled accounts in the pool which are not sheltered. And let $$y_2(p,t) = \sum_n x_n(t)$$

be the planned flow summed over all controlled sheltered accounts in the pool. Define the direct liquidity demand schedule as $$LD_i(p,t) = w_t \max(0, -y_i(p,t))$$

for i=1, 2 Define the full liquidity demand schedule as $$FLD_i(p,t) = \sum_{s \leq p} T'_{sp}(t) LD_i(s,t)$$

Output the datacube:

Pool Liquidity Demand Datacube: Direct and full liquidity demand for each pool.

| Field | Type | Contents |
|---|---|---|
| † family | id | family id |
| † entity | id | entity id |
| † strategy | id | strategy id |
| † pool | id | pool id p |
| † year | int | time in years from now t |
| direct_unsheltered | currency | direct liquidity demand for unsheltered accounts $LD_1(p, t)$ |
| direct_sheltered | currency | direct liquidity demand for sheltered accounts $LD_2(p, t)$ |
| full_unsheltered | currency | direct liquidity demand for unsheltered accounts $FLD_1(p, t)$ |
| full_sheltered | currency | direct liquidity demand for sheltered accounts $FLD_2(p, t)$ |

We also set up a liquidity vector $$L(p) = (FLD_1(p,0), FLD_1(p,1), \ldots, FLD_1(p,3), FLD_2(p,0), \ldots, FLD_2(p,3))$$

Let n be the number of asset classes. From the asset characteristic table we get a liquidity horizon $\tau_i$ for asset i. We set up a 8×n liquidity matrix A. For $j=0, \ldots, 3$ we have $$A_{ji} = \begin{cases} 1 & \text{if } \tau_i \leq j \text{ and } i \text{ is not sheltered} \\ 0 & \text{otherwise} \end{cases}$$

and for $j=4, \ldots, 7$ we have $$A_{ji} = \begin{cases} 1 & \text{if } \tau_i \leq j - 4 \text{ and } i \text{ is sheltered} \\ 0 & \text{otherwise} \end{cases}$$

4.7 Investment Horizon
4.7.1. Account Level

Let $x_n(t)$ be the cash flow for investment account n in year t. Let $I_n$ be the starting value for account n. Define $$F_1(n, t) = \begin{cases} I_n + \max(0, x_n(0)) & \text{if } t = 0 \\ \max(0, x_n(t)) & \text{otherwise} \end{cases}$$

and $$F_2(n,t) = \max(0, -x_n(t))$$

Set $$V(n, \rho) = \sum_t \rho^t [F_1(n, t) - F_2(n, t)]$$

and find $\rho$ to solve the equation $$V(n,\rho) = 0$$

We remark that $100 \times (\rho^{-1} - 1)$ is the internal rate of return on the flows. The discounted present value of the flows is $$D_n = \sum_t \rho^t F_1(n, t)$$

and the present value weighted average timing of the flows is $$N_i(n) = \frac{1}{D_n} \sum_t t \rho^t F_i(n, t)$$

Thus the average investment horizon for account n is $$H_n = \max(0, N_2(n) - N_1(n))$$

4.7.2 Pool Level

For pool p let $$\overline{F}_i(p, t) = \sum_n F_i(n, t)$$

for $i = 1, 2$ and the sum taken over controlled investment accounts in the pool. As before let $$\overline{V}(p, \rho) = \sum_t \rho^t [\overline{F}_1(p, t) - \overline{F}_2(p, t)]$$

and find $\rho$ to solve the equation $$\overline{V}(p,\rho) = 0$$

The discounted present value of the flows is $$\overline{D}_p = \sum_t \rho^t \overline{F}_1(p, t)$$

and the present value weighted average timing of the flows is $$\overline{N}_i(p) = \frac{1}{\overline{D}_p} \sum_t t \rho^t \overline{F}_i(p, t)$$

Thus the average investment horizon for pool p is $$\overline{H}_p = \max(0, \overline{N}_2(p) - \overline{N}_1(p))$$

4.8 Wealth Ratios

For pool p let $W_p$ be the direct resources in the pool and $W'_p$ the sum of direct and indirect resources. Let $C_0(p)$ be the value of liabilities and primary goals in the pool. Let $C_1(p)$ be the incremental value of secondary goals and let $C_3(p)$ be the incremental value of additional goals. Here the quantities $C_j(i)$ refer to funded amounts. For pools $p=1, 2$ let $$C'_j(i) = C_j(i) + \phi_i C_i(0)$$

For pools $i > 2$ let $$C'_3(i) = C'_3(i) + E_i$$

For $i = 0$ let $$C'_j(0) = C_j(0)$$

Let $c_3$ be the wealth ratio scaling coefficient. Define $$Y_0(p)=C'_0(p)+C'_1(p)$$

$$Y_1(p)=Y_0(p)+C'_2(p)$$

$$Y_2(p)=Y_1(p)+C'_3(p)$$

$$\rho_1(p)=\text{floor}(c_3 Y_0(p)/W'_p)$$

$$\rho_2(p)=\text{floor}(c_3 Y_1(p)/W'_p)$$

$$\rho_3(p)=\text{floor}(c_3 Y_2(p)/W'_p)$$

We term these quantities the wealth ratios.

5.0 Analysis

First we determine an investment structure at the pool level of detail. Later we translate those results to an account level of detail.

5.1 Pool Level Investment Structure

Our analysis at the pool level proceeds as an iteration over pools in descending order. Thus we first process all segregated pools, then personal pools, and finally the household pool. Thus all child pools are processed before the parent pool is processed. The recommended structure of the child pools is thus determined and the portion of this transferred to the parent becomes a locked component of the parent's allocation.

5.1.1 Final Style Calculations

To anticipate our ultimate result, for each pool s previously calculated we get a constrained optimal weight vector $h_2(s)$. Let $Z(s)$ be the style vector associated to $h_2(s)$. Let $$Z_{0i}(s) = \begin{cases} Z_i(s) & \text{if } i \text{ is an investment asset} \\ 0 & \text{otherwise} \end{cases}$$

For pool p the current pool and for time t=0 only let $$\hat{X}_0(p) = \frac{1}{\hat{V}_0(p,0)}\left[T_{pp}(p,0)\tilde{X}_0(p) + \sum_{s>p} T_{sp}(0)Z_0(s)\right]$$

$$\hat{X}'_0(p) = \frac{1}{\hat{V}_0(p,0)}\left[\tilde{V}_0(p,0)\tilde{X}'_0(p) + \sum_{s>p} T_{sp}(0)Z_0(s)\right]$$

$$\hat{X}''_0(p) = \frac{\tilde{V}_0(p,0)}{\hat{V}_0(p,0)}\tilde{X}''_0(p)$$

Similarly define $$\hat{X}_1(p,t) = \frac{1}{\hat{V}_1(p,t)}\left[\sum_{s\geq p} T_{sp}(t)\tilde{X}_1(s,t)\right]$$

$$\hat{X}_2(p,t) = \frac{1}{\hat{V}_2(p,t)}\sum_{s\leq p} T'_{sp}(t)\tilde{X}_2(s,t)$$

For all t define $$\hat{X}_3(p,t) = \frac{\hat{V}_0(p,t)}{\hat{V}_3(p,t)}\hat{X}_0(p,t) + \frac{\hat{V}_1(p,t)}{\hat{V}_3(p,t)}\hat{X}_1(p,t)$$

-continued $$\hat{X}'_3(p,t) = \frac{\hat{V}_0(p,t)}{\hat{V}_3(p,t)}\hat{X}'_0(p,t) + \frac{\hat{V}_1(p,t)}{\hat{V}_3(p,t)}\hat{X}_1(p,t)$$

$$\hat{X}''_3(p,t) = \frac{\hat{V}_0(p,t)}{\hat{V}_3(p,t)}\hat{X}''_0(p,t)$$

Output the following datacube:
Pool Styles Datacube: Style vectors attached to pools.

| Field | Type | Contents |
|---|---|---|
| † family | id | family id |
| † entity | id | entity id |
| † pool | id | pool id |
| † strategy | id | strategy id |
| † time | int | sequence time t |
| † style | id | style id k |
| all_resource | float | resource style weight $\hat{X}_{3k}(p,t)$ |
| all_locked_resource | float | locked resource style weight $\hat{X}'_{3k}(p,t)$ |
| all_unlocked_resource | float | unlocked resource style weight $\hat{X}''_{3k}(p,t)$ |
| all_claim | float | claim style weight $\hat{X}_{2k}(p,t)$ |
| direct_resource | float | direct resource style weight $\tilde{X}_{3k}(p,t)$ |
| direct_locked_resource | float | direct locked resource style weight $\tilde{X}'_{3k}(p,t)$ |
| direct_unlocked_resource | float | direct unlocked resource style weight $\tilde{X}''_{3k}(p,t)$ |
| direct_claim | float | direct claim style weight $\tilde{X}_{2k}(p,t)$ |

We will define time averaged style weights as $$\overline{X}_{1k}(p) = \frac{1}{\overline{V}(p)}\sum_{t=1}^{5} \tilde{V}_3(p,t)\tilde{X}'_{3k}(p,t)$$

$$\overline{X}_{2k}(p) = \frac{1}{\overline{V}(p)}\sum_{t=1}^{5} \tilde{V}_2(p,t)\tilde{X}_{2k}(p,t)$$

and output them as:
Mean Pool Style Datacube: Time averaged pool styles.

| Field | Type | Contents |
|---|---|---|
| † family | id | family id |
| † entity | id | entity id |
| † pool | id | pool id |
| † strategy | id | strategy id |
| † style | id | style id k |
| locked_resource | float | mean locked resource style weight $\overline{X}_{1k}$ |
| claim | float | mean claim style weight $\overline{X}_{2k}$ |

5.1.2 Investment Opportunity

If the unlocked value of the pool p is zero, then skip this pool. Otherwise, we perform two portfolio constructions, one based on current values and the other on time averaged value. We set up the portfolio construction optimization as follows:

Investment universe: The universe is the set of generic assets corresponding to the styles appearing in the strategy style scheme. This set is provided by StrategyDao.investment_universe( ).

Initial holdings: For the current time optimization use current resource style weights for pool. For the long term optimization use the optimal weights from the current optimization.

Benchmark: claim style weights for pool at time t

Alpha: α from CaseDao based on tax band $TB_1$ for current and $TB_2$ for long term mean.

Asset bounds: Let $B_k(t)$ be the locked weight of style k at time t. Let $l_k$ and $u_k$ be the lower and upper bounds on style k from the StrategyDao. Define effective lower and upper bounds as $$L_k(t) = \max(B_k(t), l_k)$$

$$U_k(t) = \min(B_k(t), u_k)$$

Covariance matrix: Ω from StrategyDao based on tax band $TB_1$ for current and $TB_2$ for long term mean.

Asset style, sector, region exposures: from economic database through SecurityDao.

Asset price: equal to 1 for all assets.

Lot and wash sale: not used.

Trading restrictions: none apply.

Asset classification: not used.

Sheltered: The vector S is provided by strategyDao.sheltered( ). The sheltered ratio is in the mean pool summary datacube.

Liquidity requirement: The liquidity vector FLD(p) and liquidity matrix A define this constraint.

Let h(λ) be the optimal solution for some risk aversion λ. Let h'(t) be the uncontrolled weight (i.e. the locked style $\tilde{X}'_3(t)$.) Let g=ρ(h(λ)−h'(t)) where ρ is the full resource value divided by the controlled value (both at time t.) Define $$\phi(\lambda) = 1200\alpha \cdot h(\lambda)$$

$$\phi_c(\lambda) = 1200\alpha \cdot g$$

$$\sigma(\lambda) = \sqrt{120000 h(\lambda)^t \Omega h(\lambda)}$$

$$\sigma_c(\lambda) = \sqrt{120000 g^t \Omega g}$$

$$\psi = \phi_c(\lambda) - 2\sigma_c(\lambda)$$

Then define $$\phi_0 = \phi(\infty_{risk})$$

$$\sigma_0 = \sigma(\infty_{risk})$$

$$\phi_1 = \phi(0)$$

$$\sigma_1 = \sigma(0)$$

Here $\infty_{risk}$ is a value from the advisor database. If the risk questionnaire supplies a limit L let τ(λ)=ψ(λ) if is_loss_limit is true and τ(λ)=$\sigma_c$(λ) otherwise. Define $$\lambda_c = \min\{\lambda \in [0, \infty] | \tau(\lambda) \leq L\}$$

and set z=0. If the set is empty then pick $\lambda_c$ to minimize $$\tau(\lambda) - L$$

and set z=1. Define $$\phi_2 = \phi(\lambda_c)$$

$$\sigma_2 = \sigma(\lambda_c)$$

Get the strategy scaling factors $c_1$ and $c_2$ from the advisor database. Define $$x_i = \text{floor}(c_1 \phi_i)$$

$$y_i = \text{ceil}(c_2 \sigma_i)$$

Look up the coordinate tuple $(x_0, y_0, x_1, y_1)$ in the strategic opportunity table (from the advisor database) and let $w_1$ denote the resulting opportunity value. If there is a risk questionnaire and z=0 look up the tuple $(x_0, y_0, x_2, y_2)$ and denote the result as $w_2$. If instead z=1 let $w_2$ be the value associated to the tuple $(x_2, y_2, x_2, y_2)$. If there is no risk questionnaire let $w_2 = w_1$.

Generate the following datacube:

Pool Opportunity Datacube: Investment opportunity for each pool.

| Field | Type | Contents |
| --- | --- | --- |
| † family | id | family id |
| † entity | id | entity id |
| † pool | id | pool id |
| † time | int | sequence time t |
| current_full_opportunity | int | opportunity $w_1$ for current data |
| current_constraint_satisfied | Boolean | true if no risk questionnaire or z = 1 for current data |
| current_constrained_opportunity | int | opportunity $w_2$ for current data |
| long_term_full_opportunity | int | opportunity $w_1$ for mean data |
| long_term_constraint_satisfied | Boolean | true if no risk questionnaire or z = 1 for mean data |
| long_term_constrained_opportunity | int | opportunity $w_2$ for mean data |

5.1.3 Strategy Lookup

Collect the following data for the full opportunity and the constrained opportunity.

1. adjusted investment horizon H'(p)
2. initial opportunity $w_1$
3. mean opportunity $w_2$
4. wealth ratio $\rho_1(p)$
5. wealth ratio $\rho_2(p)$
6. wealth ratio $\rho_3(p)$ Use data as a key to retrieve the risk budget $\sigma_b$ and consumption budget $\phi_b$ for the current year from the StrategyDao. For pool p, denote the risk budget for the full opportunity as $\sigma_1(p)$ and for the constrained opportunity as $\sigma_2(p)$. Use a similar indexing for the consumption budget φ. Output the following datacube:

Pool Strategy Datacube: Strategy for each pool.

| Field | Type | Contents |
| --- | --- | --- |
| † family | id | family id |
| † entity | id | entity id |
| † pool | id | pool id i |
| horizon | float | pool level investment horizon $\overline{H}(p)$ |
| primary_ratio | int | wealth ratio $\rho_1(p)$ |
| secondary_ratio | int | wealth ratio $\rho_2(p)$ |
| tertiary_ratio | int | wealth ratio $\rho_3(p)$ |
| full_risk_budget | float | full risk budget for current year $\sigma_1(p)$ |
| full_consumption_budget | float | full consumption budget for current year $\phi_1(p)$ |
| constrained_risk_budget | float | constrained risk budget for current year $\sigma_2(p)$ |
| constrained_consumption_budget | float | constrained consumption budget for current year $\phi_2(p)$ |

5.1.4 Pool Level Asset Allocation

Now for these pools p repeat the investment opportunity optimization, but adjust the risk aversion to match the supplied full risk budget. Denote the optimal return by $\alpha_1(p)$ and the optimal holdings by $h_1(p)$. If the constrained budget is different, then perform the optimization in that case also and denote the return and holdings by $\alpha_2(p)$ and $h_2(p)$. If they are not different just set $\alpha_2(p)=\alpha_1(p)$ and $h_2(p)=(p)$. Let $\Delta(p)=\alpha_1(p)-\alpha_2(p)$.

Output the following datacubes:

Pool Properties Datacube: Properties of optimal pool portfolios.

| Field | Type | Contents |
|---|---|---|
| † family | id | family id |
| † entity | id | entity id |
| † strategy | id | strategy id |
| † pool | id | pool id p |
| full_risk | float | full risk budget $\sigma_1(p)$ |
| constrained_risk | float | constrained risk budget $\sigma_2(p)$ |
| full_return | float | full return $\alpha_1(p)$ |
| constrained_return | float | constrained return $\alpha_2(p)$ |
| return_gap | float | full_return minus constrained return $\Delta(p)$ |

Pool Portfolio Datacube: Optimal portfolio at the pool level.

| Field | Type | Contents |
|---|---|---|
| † family | id | family id |
| † entity | id | entity id |
| † strategy | id | strategy id |
| † pool | id | pool id p |
| † asset | id | asset id k |
| optimal_weight | float | weight in optimal portfolio $h_{1k}(p)$ |
| constrained_weight | float | weight in constrained portfolio $h_{2k}(p)$ |

Now proceed with the next pool in the iteration over pools.

5.2 Account Level Investment Structure

Next we determine the investment structure at the account level. For each pool p we have the constrained weights $h_2(p)$. We are only concerned with investment assets, so drop the components of the vector corresponding to non-investment assets as determined by StrategyDao.investment_asset( ) and denote the result by $h(p)$.

Recall the claim transfer coefficient $T'_{sp}(0)$ giving the value transferred from s to p as a percentage of the ending value of p. Let $$h'(p) = \sum_{s \ne p} T'_{sp}(0) h(s)$$

be the contribution from children. Let $$x_p = T'_{pp}(0)$$

be the weight of the direct assets. If this quantity is nonzero then the direct assets should be allocated as $$h''(p) = \frac{1}{x_p}[h(p) - h'(p)]$$

and if $x_p=0$ then we may stop processing pool p.

Let $L(p,0)$ be the direct locked investment weight in pool p. Let x be the ratio of direct unlocked value in p to direct value of p, i.e.

$$x = \frac{V''_0(p,0)}{W_p(0)}$$

If $x=0$ then the allocation vector $a(p)$ for unlocked assets is $a(p)=0$. Otherwise let $$a(p) = \frac{1}{x}[h''(p) - L(p)]$$

Define $$a'_i(p) = \begin{cases} a_i(p) & \text{if } i \text{ is a sheltered asset} \\ 0 & \text{otherwise} \end{cases}$$

and set $$a''_i(p) = a_i(p) - a'_i(p)$$

Use StrategyDao.sheltered( ) to determine which assets are sheltered.

Iterate over the investment accounts i attached to pool p. Let $V''_i(0)$ be the direct unlocked value in the account and let $X'_k(i)$ be the locked value of style k in the account. If the account is sheltered let $y(i)=a'(p)$ and otherwise let $y(i)=a''(p)$. Set the total value in asset k for account i to $$V_k(i) = L_k(i) + W_i a''_k(p)$$

Let the account value be $V_i(0)$. Define $$B_k(i) = V_k(i)/V_i(0)$$

$$B'_k(i) = L_k(i)/V_i(0)$$

$$B''_k(i) = B_k(i) - B'_k(i)$$

Then B is the benchmark for the account. B' and B'' divide this benchmark into locked and unlocked parts.

Let $V_p$ be the value of pool p and define $$\bar{V} = \sum_p V_p$$

$$\bar{\Delta} = \frac{1}{\bar{V}} \sum_p V_p \Delta_p$$

$$K = \sum_p \Delta_p V_p$$

$$\bar{\sigma}_j = \frac{1}{\bar{V}} \sum_p V_p \sigma_j(p)$$

$$\bar{\alpha}_j = \frac{1}{\bar{V}} \sum_p V_p \alpha_j(p)$$

for j=1,2

Output the following datacubes:

Cost of Risk Policy Datacube: Summarizes impact of risk questionnaire.

| Field | Type | Contents |
|---|---|---|
| † family | id | family id |
| † entity | id | entity id |

| Field | Type | Contents |
|---|---|---|
| full_risk | float | averaged full risk budget $\bar{\sigma}_1$ |
| constrained_risk | float | averaged constrained risk budget $\bar{\sigma}_2$ |
| full_return | float | averaged full return $\bar{\alpha}_1$ |
| constrained_return | float | Averaged constrained return $\bar{\alpha}_2$ |
| return_gap | float | full_return minus constrained return $\bar{\Delta}$ |
| cost | currency | cost of return gap in dollars of investment return per year K | account_summary Datacube: Basic account data.

| Field | Type | Contents |
|---|---|---|
| † account | id | account id n |
| advised | Boolean | true if advised |
| taxed | Boolean | true if taxable |
| value | currency | current portfolio value |
| horizon | float | investment horizon in years $H_n$ | current_allocation Datacube: Current allocation of accounts.

| Field | Type | Contents |
|---|---|---|
| † account | id | account id |
| † asset | id | asset class id |
| weight | percent | Weight in asset class | recommended_allocation Datacube: Recommended allocation for advised accounts.

| Field | Type | Contents |
|---|---|---|
| † account | id | account id i |
| † asset | id | asset class id k |
| total_weight | percent | total weight in asset class $B_k(i)$ |
| locked_weight | percent | weight in asset class due to locked positions $B_k'(i)$ |
| free_weight | percent | total_weight minus locked_weight $B_k''(i)$ |

These are the datacubes which pass to portfolio construction. The parameters contained in these datacubes allow construction of efficient portfolios that apply Markowitz or similar approaches. In particular, the risk parameter can be used to select a portfolio along an efficient frontier.

Our Dynamic Optimization and Life Planning

To explain more completely our selection of strategy of construction and risk levels to apply at particular times under particular conditions, we revisit Merton's continuous time stochastic control problem and then specify a discrete version of the problem. The discrete problem leads to an elegant solution.

1. The Continuous Time Stochastic Control Problem

Here we articulate the general finite horizon continuous time stochastic control problem. We suppose we have a finite time interval I=[0,T] where 0 corresponds to "now" and T represents the terminal time. We suppose there is a state space S which in most cases is a subset of some real vector space and a control space C which is also a subset of some real vector space. There is a "particle" taking positions in S. We denote by x(t) the position of this particle a time t. At each moment t we are allowed to choose a control action c(t) in C. This choice will influence but not entirely determine the movement of the particle over the next instant. In general, there is a probability distribution $P(y, t, x_0, c_0)$ which gives the probability that $x(t+dt)=y$ given that $x(t)=x_0$ and that control action $c(t)=c_0$ was taken. Thus $P:S \times I \times S \times C \rightarrow [0, 1]$. We refer to P as the dynamic law governing the particle. In general, we seek functions specifying the control action to be taken. We allow the decision on the control action to depend only on information known up to time t. For the dynamic laws of interest to us, in general the past history of the particle relevant to the control action may be summarized in its current state. Hence we are interested in functions $c:I \times S \rightarrow C$ where $c(t, x_0)$ denotes the control action to be taken at time t given that $x(t)=x_0$. We refer to such a function as a control policy and denote the set of such policies by K. We denote by $x_c(t, x_0)$ the position at time t of the particle controlled by policy c∈K given that the particle started from position $x_0$ at time 0. Then $x_c(t, x_0)$ is a random variable whose distribution is controlled by the dynamic law.

We suppose that there is a utility function $u:I \times S \times C \rightarrow R$ where $u(t, x_0, c_0)$ gives the utility of $x(t)=x_0$ given that $c(t)=c_0$. We suppose there is a weight function $\rho:I \rightarrow [0, 1]$ which weights the importance of different time moments. The we define a utility function $U:S \times K \rightarrow R$ by $$U(x_0,c)=E[\int_0^T \rho(t)u(t,x_c(t,x_0)dt]$$

where E[ ] is the expectation operator. The optimal stochastic control problem is to find $\tilde{c}:S \rightarrow K$ such that $$U(x_0,\tilde{c}(x_0)) \geq U(x_0,c)$$

for all policies c in K. In other words, given our starting state we seek the control policy which leads to a trajectory on the particle for time [0, T] with the highest expected utility. We define $J:S \rightarrow R$ to be given by $J(x_0)=U(x_0, ec(x_0))$. In other words J is the maximum expected utility available starting from $x(0)=x_0$.

Pick a time $t_0$ in I. A key aspect of the stochastic control problem is that the best policy to follow over I contains the best policy to follow over $[t_0, T]$ for the particle that commences motion at $x(t_0)$. Accordingly we may define $\phi:I \in S \rightarrow C$ to be the action $\phi(t_0, x_0)$ taken under the optimal policy at −0, time $t_0$ given that $x(t_0)=x_0$. We refer to phi as the optimal policy. Similarly we may define $$J(t_0,x_0)$$

to be the expected utility over $[t_0, T]$ for the particle governed by the optimal policy and commencing motion from $x(t_0)=x_0$. In general the functions $\phi(t, x)$ and $J(t, x)$ are the key items we seek to solve for.

By applying suitable regularity conditions we may state the definitions for the optimal policy and expected utility as partial differential equations. For simple but still interesting problems these PDEs are analytically tractable. In general, however, one must resort to numerical techniques for solution. There are two routes to a numerical solution. One is to apply standard numerical techniques to solution of the PDEs. The other is to approximate the continuous time problem by a discrete time problem. Both methods ultimately reduce to solving a family of difference equations on a grid. Under reasonable regularity conditions the solution of the grid problem will converge under grid refinement to the continuous time problem. However convergence tends to be a rather delicate affair numerically. Taking the approach of discretizing the problem better preserves insight about the problem's solution and thus helps one solve the problems of numerical convergence. Accordingly, we shall take that route.

2. The Discrete Time Stochastic Control Problem

For the discrete time problem we divide the interval I into points $t_0, t_1, \ldots, t_n$ where $t_0=0$ and $t_n=T$. In the simplest case of equal time division we have Delta$t=T/n$ and $t_i=i\Delta t$. More generally we write Delta$t_i=t_i-t_{i-1}$. Similarly, we need to discretize the state space S. Here the usual process is to first pick a bounded subset $S_i$ of S such that the particle is almost surely in this bounded subset at time $t_i$. One then dissects the bounded subset into a finite collection of cells $b_{j,i}$ for j in $\{1, 2, \ldots, m>\}$ One represents each cell by its midpoint $s_{j,i}$. One considers a particle which is restricted to occupying these points. Its dynamical law takes the form $P(t_i, s_{j,i}, s_{k,i-1}, c)$ which gives the probability that the particle at time $t_i$ was at point $s_{j,i}$ given that at the previous moment $t_{i-1}$ it was at $s_{k,i-1}$ and control action c was taken. For this to be a dynamical law one has the requirements $$P(t_i, s_{j,i}, s_{k,i-1}, c) \in [0,1]$$

and $$\sum_j P(t_i, s_{j,i}, s_{k,i-1}, c) = 1$$

For the solution of the discrete problem to converge to the solution of the continuous problem the dynamical law should converge. As long as the discrete dynamical law is a good approximation of the continuous law, however, this convergence will occur. For instance the discrete law might approximate to the cell transition frequencies calculated from the continuous law. Freedom in arranging this approximation is an important route to tractability. At any point in time for the continuous process there is some probability that the particle will escape from the bounding box. However, for the discrete process this cannot be allowed. Thus a final point of specifying the discrete process is a choice of behavior at the boundaries. Popular choices of behavior at the boundary include "sticking" (the article which would have escaped is returned to the boundary), "reflection" (the particle bounces off the boundary) and halting the process. Physical intuition will suggest the proper treatment. For instance conservation of energy might suggest stickiness, while conservation of momentum suggests reflection and breakdown of the model corresponds to halting. As long as the bounding box in state space is chosen sufficiently large, arriving at the boundary will be a low probability event and the choice of boundary behavior will not be critical to convergence. Choosing a boundary behavior consistent with the underlying continuous time model, however, will minimize the injection of numerical noise into the discrete solution and thus lead to better behaved solutions. Again this is a point where physical insight may be brought to bear.

To summarize the data of the discrete problem, we have 1. n+1 time points $\{t_0, t_1, \ldots, t_n\}$
2. A grid of space points $\{s_{j,k} | 0 \leq j \leq m_k, 0 \leq k \leq n\}$
3. A control space C
4. A probability law $P(i, s_{j,i}, s_{k,i-1}, c)$ for $0 \leq i \leq n$, $0 \leq j \leq m_i$, $0 \leq k \leq m_{i-1}$ and c in C.
5. A utility function $u(i, s_{j,i}, c)$ for $0 \leq i \leq n$ and $0 \leq j \leq m_i$
6. An expected utility function $$U(i, s_{j,i}, c) = \sum_{j=i}^{j=n} \sum_{k=0}^{m_j} \rho(t_i, t_j) u(j, s_{k,j}, c) Prob(x_c(t_j) = s_{k,j} | x(t_i) = s_{j,i})$$

We have not said much about the control space C. At this point we will posit that at time $t_i$ the control space is a prism in some real vector space, i.e.

$$C = \{(t_i, c) | c \in R^m \text{ and } x_i \leq c \leq y_i\}$$

for bounding vectors x and y possibly depending on time. Here the inequality operators are taken component wise, so $x_i \leq c$ means $x_{i,j} \leq c_j$ for all j. We will also slightly generalize the time weighting function $\rho$ by allowing it to depend on the initial time as well as the actual time.

We will represent the data of the problem by the data structure

```
class ControlProblem
{ public:
    virtual ~ControlProblem( ) { }
    float horizon( );       // time horizon
  int space_dim( );         // dimension of the state space
  int control_dim( );       // dimension of the control space
  int time_slices( );       // returns the number of discrete time points
  int states(int i);        // returns number of space states at time i
  Vector<float> lower_control(int i);    // lower bound on control at time i
  Vector<float> upper_control(int i);    // upper bound on control at time i
  Vector<float> point(i,j); // returns co-ordinates of point in state space
    float transition(int i, int j, int k, Vector<float> c);
    // return probability given control c
    float utility(i,j,Vector<float> c);
    // utility of being in state j at time
    float weight(i,j);
    // weight function at time j given problem
};
```

This is an abstract base class from which specific problems will be derived.

The solution of the problem consists of the optimal policy and the expected utility. We represent it by the data structure

```
class ControlSolution
{ private:
    int _time;          // number of time points
    Vector<int> _state; // number of states at each time
  Matrix<Vector<float> > _control;  // the controls indexed by (time,state)
    Matrix<float> _utility;         // utility indexed by (time,state)
  assert_valid(int time, int state);  // checks that the (time,state)
  combination is
  public:
    ControlProblem(int no_times,Vector<int>
  no_states){_time=no_times; _state=virtual ~ControlProblem( ) { }
    void store(int time, int state, Vector<float> control, float utility);
//
  Vector<float> control(int i, int j);
  // optimal control action at time i given occupancy
  float utility(int i, int j);
  // expected utility given being in state j at
};
// The following class is used to report index violations
class InvalidStateException : public Exception
{ private:
  int _time, _state;
  public:
  InvalidStateException(int time, int state);
    ~InvalidStateException( );
```

-continued

```
std::string message( ) const;
};
```

3. The Bellman Algorithm

Despite its apparent complexity, the optimal control problem is amenable to a solution technique known as the Bellman algorithm. This algorithm remarks that the optimal solution over the interval [t−1, T] when restricted to the interval [t, T] is identical to the solution of the control problem over [t, T]. Hence we may start with t=T and then move progressively through T−1, T−2, . . . , 0 to build up a solution to the problem starting at time 0. What is required to implement this algorithm is a method of solving the single time period problem of finding the optimal control at time t supposing the problem already solved for all subsequent times. We refer to this as the sub problem. To be specific, we suppose the following has already been found:

1. the optimal control $\phi(i, j)$ to be applied at time i and state j for all times i>t and states valid at such times
2. the expected utility J(i, j) resulting from following the optimal policy given that we started at time i and in state j
3. The sub problem at time t is for each state k to find that control c(k) such that $x_t \leq c(k) \leq y_t$
4. We maximize $$z_k = \rho(t, t)u(t, k, c(k)) + \sum_j J(t+1, j)P(t, k, j, c(k))$$

5. where the sum is over all states defined at time t+1.

In this case we have $$\phi(t,k)=c_k$$

$$J(t,k)=z_k$$

In computer terms, a sub problem solver will be supposed to derive from the following abstract base class:

```
class ControlSubproblemSolver
{ public:
    virtual ~ControlSubproblemSolver( ) { }
    void set_problem(ControlProblem p);
    // supply problem
    void set_known(int n, const ControlSolution &known);
    // supply known
    void calculate(int k, Vector<float> &control, float &utility)
    // for time
};
```

The Bellman algorithm is then encapsulated in the class:

```
class BellmanSolver
{ private:
    ControlProblem &_p;
    ControlSubproblemSolver &_solver;
    ControlSolution _solution;
  public:
    BellmanSolver(ControlProblem &p, ControlSubproblemSolver &s);
    ~BellmanSolver( ) { }
    void calculate( );
    ControlSoution solution( ) { return _solution; }
};
```

4. The Asset-Liability Management Problem

We now specialize to a specific control problem and provide the metric formulation that makes the problem solvable with reasonable computation. We consider an investor managing a fund so as to meet a schedule of liability payments. His controls include the investment risk borne, the investment costs incurred and the allocation of funds to liability payment. The utility of a policy is measured by its success in funding the liabilities.

The state space for this problem will be contained in $R^3$. In the state vector s(t) we take $s_0(t)$ to denote the investor's wealth at time t. We take $s_1(t)$ to represent the investor's basis as a fraction of wealth. We take $s_2(t)$ to represent the CPI index at t normalized so $s_2(0)=1$. Often we use the more intuitive notation of $W(t)=s_0(t)$, $B(t)=s_1(t)$ and $I(t)=s_2(t)$ for the wealth, basis fraction and inflation index respectively. Note that $0 \leq W(t)$, $0 \leq B(t) \leq 1$ and $0 \leq I(t)$ for all t. Only W(t) and I(t) are potentially unbounded and for fixed T it is easy to pick bounds $\overline{W}$ and $\overline{I}$ such that $W(t) \leq \overline{W}$ and $I(t) \leq \overline{I}$ for all t∈[0, T] with high probability. Thus the state space is effectively a rectangular prism in $R^3$.

The control space will also be a subset of $R^3$. In the control vector $\phi(t)$ we take $\phi_0(t)$ to denote the investor's funding of liabilities at time t. We take $\phi_1(t)$ to denote the fraction of turnover at time t and we take $\phi_3(t)$ to be the investor's investment risk at time t. Both $\phi_0(t)$ and $\phi_1(t)$ will be denoted as fractions of W(t) and thus they lie in [0, 1] for all t. In fact one has $0 \leq \phi_0(t)+\phi_1(t) \leq 1$. In general $\phi_3(t) \in [a(t), b(t)]$ for suitable functions a(t) and b(t) which describe the investment opportunity available at time t.

Next we consider the liabilities. We suppose a liability schedule $x_i(t)$ of the form $$x_i(t)=c_{i,0}(t)+c_{i,1}(t)I(t)$$

where i=0, 1, 2 and $x_i(t) \leq x_{i+1}(t)$ for all t. The levels of i correspond to priority classes on spending with i=0 corresponding to essential spending, i=1 representing less essential and i=2 representing least essential spending. Let $e(t)=\phi_0(t)W(t)$ be the expenditure on liabilities at time t. Suppose $x_0(t)<x_1(t)$ set $$\tilde{e}(t) = \begin{cases} \dfrac{e(t) - x_0(t)}{x_1(t) - x_0(t)} & \text{if } e(t) \leq x_2(t) \\ \dfrac{x_2(t) - x_0(t)}{x_1(t) - x_0(t)} & \text{if } e(t) > x_2(t) \end{cases}$$

If $x_0(t)=x_1(t)<x_2(t)0$ then let $$\tilde{e}(t) = \begin{cases} \dfrac{e(t) - x_0(t)}{x_2(t) - x_0(t)} & \text{if } e(t) \leq x_2(t) \\ 1 & \text{if } e(t) > x_2(t) \end{cases}$$

If $x_0(t)=x_1(t)=x_2(t)>0$ then let $$\tilde{e} = \begin{cases} \dfrac{e(t) - x_0(t)}{x_0(t)} & \text{if } e(t) \leq 2x_0(t) \\ 1 & \text{if } e(t) > 2x_0(t) \end{cases}$$

If $x_0(t)=x_1(t)=x_2(t)=0$ then let tildee=1. We define the utility of this spending as $$u(t, W, \phi)=\log(\tilde{e}(t))$$

This utility function describes a spending policy which must exceed $x_0(t)$ but where there is ever decreasing utility to increased spending. The choice of utility function is rather arbitrary and is motivated primarily by the solutions to which it gives rise. The utility function of a policy is given by $$\sum_t u(t, W(t), \phi(t))$$

In other words we take the time weighting function to be identically one. This implies there is no benefit to shifting spending between periods.

Next we derive the dynamics. Let $\tilde{B}(t)=\min(B(t), 1))$ and let g denote the capital gain tax rate. At time t turnover $\phi_1(t)$ occurs. This results in trade volume $\phi_1(t)W(t)$ and a gain tax of $g(1-\tilde{B}(t))\phi_1(t)W(t)$. In addition basis is reduced to $(1-\phi_1(t))B(t)W(t)$ and a payout of $\phi_0 W(t)$ occurs. After tax and payout are complete the remaining wealth is $$W'(t)=[1-\phi_0(t)-g(1-\tilde{B}(t))\phi_1(t)]W(t)$$

In addition we are left with net proceeds of $$\phi_1 W(t)-g(1-\tilde{B}(t))\phi_1 W(t)-\phi_0 W(t)=([1-g(1-\tilde{B}(t))]\phi_1-\phi_0)W(t)$$

to reinvest and thus the new basis is $$B'(t)=[(1-\phi_1(t))B(t)+([1-g(1-\tilde{B}(t))]\phi_1-\phi_0)]W(t)$$

Suppose we earn a return r(t) over the next period. Then $$W(t+1)=(1+r(t))W'(t)=(1+r(t))[1-\phi_0(t)-g(1-\tilde{B}(t))\phi_1(t)]W(t)$$

and $$B(t+1) = B'(t)/W(t+1)$$
$$= \frac{(1-\phi_1(t))B(t) + ([1-g(1-\tilde{B}(t))]\phi_1 - \phi_0)}{(1+r(t))[1-\phi_0(t)-g(1-\tilde{B}(t))\phi_1(t)]}$$

Note the requirement that $[1-g(1-\tilde{B})]\phi_1 \geq \phi_0$. This observation motivates the introduction of $$\tilde{\phi}_0 = \begin{cases} \dfrac{\phi_0}{[1-g(1-\tilde{B})]\phi_1} & \text{if } \phi_1 > 0 \\ 0 & \text{otherwise} \end{cases}$$

and then the constraint takes the form $\tilde{\phi}_0 \in [0, 1]$ which is a simpler form to work with.

Some Particular Embodiments

The present invention includes a system that interacts closely with hardware elements and a method executed by the system. The system and method can be viewed from the perspective of an overall system, a server that generates strategy recommendations, or a user interacting with the system. The invention may be embodied in an article of manufacture such as media impressed with programs or logic that generate strategy recommendations. Generation of strategy recommendations generally can be extended to simulation of outcomes resulting from following the strategy recommendations.

Solar Car

One embodiment disclosed is a planning server 714 for selecting at least immediate control actions during a solar car race and preferably establishing a control action policy. By control action policy, we mean an array of control actions to take when the solar car finds itself in a particular state, such as a combination of battery charge, position on the course and immediately available solar power (which depends on uncertain weather conditions and time of day.) The position on the course may be subdivided into equal length segments or into segments with similar slopes. The subdivision can further subdivide a segment based on a maximum distance or time of transit. With sufficient computing resources, the segments could be subdivided 100 meter increments or less. The planning server has access to one or more repositories of electronic data that include (a) current resource information, (b) future goal information, (c) performance opportunity information and (d) resource replenishment risk information (712 and 713). The current resource information includes at least battery charge level. The future goal information includes at least course information and minimum battery charge levels. Performance opportunity information includes how power consumption converts into distance traveled over time. The performance opportunity takes into account variations in slope and, optionally, may take into account head winds. The resource replenishment risk information reflects the likely solar power, as impacted by time of day, weather and course (such as shaded areas.) The resource replenishment separately accounts for times when the solar car is on course and in its aerodynamically efficient configuration, and times when the solar car is parked with its solar array oriented directly toward the sun.

The planning server includes an alternative resource holding generating module, problem initiation module and control action recommendation module. The alternative resource holding generating module accesses future goal information, performance opportunity information and resource replenishment risk information and determines risk and return metrics of alternative resource holdings over a predetermined planning horizon. Risk metrics may relate remaining battery charge to expected weather risks that impact resource replenishment (solar power) and performance (expected head winds) at various points along the course. The risk and reward metrics may be pre-computed to allow simulations to run more efficiently.

The planning server further includes a problem initiation module 822 that accesses at least some of the data compilations. This module establishes a search grid that spans and subdivides dimensions of the problem. It effectively converts a continuous problem into a discrete problem that is amenable to numerical algorithms. Alternatively, some dimensions of the search grid may be continuous. The search grid dimensions may include the time horizon of analysis, a range of resource replenishment risk levels, potential resource levels and a range of consumption levels. Preferably, the potential resource levels include a resource cushion level at the end of the planning horizon or at until close to the finish line, when expected weather conditions are virtually certainty. Information in the data compilations, some of which may be hard coded into the system, can be used to generate the search grid, optionally subject to revision by a user. The problem initiation module outputs the search grid. The output may be an object stored in memory or persisted to a nonvolatile memory. It may be a handful of parameters passed to another module.

The control action recommendation module 823 accesses the search grid generated by the problem initiation module, the risk and return metrics generated by alternative resource holding generating module and the data compilations. The control action recommendation module performs an evaluation over the time horizon and recommends control actions that can be followed by advisers or automatically implemented by other modules. For particular times within the time horizon and for particular resource values, the control action recommendation module evaluates control actions that select a consumption level and a risk level. The risk level may be selected from a range of available risk levels.

Evaluation of the control actions at least combines an immediate utility resulting from consuming power (and going fast) and a long-term expected utility of results achieved by following a particular set of control actions. The immediate utility relates to a particular segment of the search grid, typically a kilometer or less. The long-term expected utility of a particular result expresses the utility from that point forward to the end of the time horizon. That is, the long-term expected utility is a summation from a particular segment to the end of the time horizon. Preferably, calculations proceed from the end of the time horizon backwards, so that long-term expected utility values of later periods are available when calculating expected utility values of control actions taken in earlier periods. Long-term utility values are expressed as expected utility values that result from particular control actions. This involves applying a probability distribution function to determine likely future outcomes. In one embodiment, the utility of failing at any time through the time horizon of running out of power is prohibitive. A logarithmic utility function can be scaled so that running out of power has an infinitely negative utility. Continuous functions that have very steep slopes near the point of barely being able to move the solar car also make it prohibitive to fail to satisfy the goals. A rule that assigns an infinitely negative utility to missing an essential goal has the same effect, regardless of the shape of utility function elsewhere. By prohibitive, we mean that encountering more than a remote probability $\alpha$ of missing an essential goal at any time during the time horizon, where $\alpha \leq 0.05$, or preferably $\leq 0.01$, or more preferably $\leq 0.001$, causes the utility over the time horizon to be lower or less favorable than the utility of courses of action that do not have the threshold probability of missing any essential goal.

The control action recommendation module outputs at least recommended control actions for the beginning period of the analysis. That is, control actions to be followed immediately may result from the analysis. These control actions may include at least a consumption level and a portfolio risk level. Optionally, the control actions may be linked to further modules that refine control actions in terms of particular assets. The control actions also may be linked to modules that automatically implement the control actions.

A further aspect of this invention is a control strategy evaluation system that includes the planning server. In this embodiment, the planning server control recommendation module outputs a control strategy data cube that includes control strategies for selection of consumption levels and selection of portfolio risks that span dimensions of the search grid. The control strategy data cube would include recommended consumption and risk levels spanning at least the time horizon and resource values found in the search grid. The control strategy evaluation system would further include a simulation server 715 that accesses the control strategy data cube and conducts at least 50 probabilistic simulation runs over the time horizon. The simulation runs would apply the control strategies to the simulated intermediate economic events and report the distribution of simulated outcomes. The simulation server might perform at least 100 probabilistic simulation runs, or preferably 500 probabilistic simulation runs, or more preferably 1000 probabilistic simulation runs in order to generate a statistically significant distribution of outcomes.

Portfolio Planning

One embodiment disclosed is a planning server 714 for selecting at least immediate control actions in a multi-year planning setting. The years in the planning setting may be treated as years or subdivided into months or weeks. With sufficient computing resources, the periods could be subdivided into weeks or days. The planning server has access to one or more repositories of electronic data that include portfolio information, goal information and market information (712 and 713). The portfolio information includes pluralities of investment and non-investment resources available over multiple time periods. The goal information includes pluralities of one time and repeating expenditure goals and at least two levels of priority that span essential and nonessential expenditure goals. Preferably, the priority levels include essential, target and aspirational goals. Additional levels of goals or even selection of goals on a continuum can be used to express the goal information. Individual goals, such as payment of living expenses, may be broken into parts and represented partially as an essential goal and partially in another priority level. Market information includes estimates of available investment opportunities, risks, rewards and covariance ratios among assets. The covariance ratios allow calculation of an overall statistical portfolio of assets with mixed characteristics. The information to which the planning server has access can be treated as part of the environment in which the technology disclosed has practical application. Alternatively, the servers that host portfolio, goal and market information may be combined with the planning server to describe an overall system.

The planning server includes an alternative portfolio generating module, problem initiation module and control action recommendation module. The alternative portfolio generating module accesses to the data compilations and calculates alternative diversified risk portfolios with a range of available risk levels for particular times within a time horizon. The available risk levels may be expressed in terms of variability of returns (such as statistical variance) or value-at-risk. The alternative portfolios may be selected applying a variation on Markowitz's classical method or some equivalent approach. Those portfolios that produce the greatest return for a given degree of risk can be described as being on the efficient frontier. Optionally, the alternative diversified portfolio calculation can take into account the covariance ratios between investment and non-investment resources. As the mix of investment and non-investment resources changes, preferences among alternative portfolios may change. The calculation of alternative diversified portfolios may take into account both assets that can be liquidated and redeployed and assets that are locked in position. The calculation also may take into account initial conditions of portfolio risk level and embedded gain. The initial portfolio risk level indicates the extent of turnover required to reach an alternative risk level. The embedded gain indicates the tax likely to be realized due to a particular extent of turnover.

The planning server alternative portfolio generating module does not extend to selecting assets to hold or liquidate. Additional modules that deal with particular assets may be combined with the portfolio generating module.

By interacting with the data compilations and considering alternative starting conditions of risk level and embedded gain, the alternative portfolio generating module 821 persists to storage a set of portfolios represented by risk and return curves that can be used in evaluation and selection of alternative control actions. Optionally, the starting conditions also may include standardized portfolio assets that correspond to non-investment or locked investment portions of a portfolio.

The planning server further includes a problem initiation module 822 that accesses at least some of the data compilations. This module establishes a search grid that spans and subdivides dimensions of the problem. It effectively converts a continuous problem into a discrete problem that is amenable to numerical algorithms. Alternatively, some dimensions of the search grid may be continuous. The search grid dimensions may include the time horizon of analysis, the range of available risk levels, potential resource levels and a range of consumption levels that meet at least the essential goals. Information in the data compilations, some of which may be hard coded into the system, can be used to generate the search grid, optionally subject to revision by a user. The potential resource values optionally may include both investment and non-investment resources, especially when non-investment resources are available to satisfy goals. For instance, salaries and Social Security benefits may be included in the resources. The consumption level optionally may be expressed as a ratio of resource or combined resource values. The problem initiation module outputs the search grid. The output may be an object stored in memory or persisted to a nonvolatile memory. It may be a handful of parameters passed to another module.

The control action recommendation module 823 accesses the search grid generated by the problem initiation module, the risk and return functions generated by the alternative portfolio generating module and the data compilations. The control action recommendation module performs an evaluation over the time horizon and recommends control actions that can be followed by advisers or automatically implemented by other modules. For particular times within the time horizon and for particular resource values or wealth, the control action recommendation module evaluates control actions that select a consumption level and a risk level. The consumption level may be a ratio selected from a range of ratios. The risk level may be selected from a range of available risk levels.

Evaluation of the control actions at least combines an immediate utility resulting from consumption and a long-term expected utility of results achieved by following a particular set of control actions. The immediate utility relates to a particular time, typically the current period of analysis or the next period. The long-term expected utility of a particular result expresses the utility from that point forward to the end of the time horizon. That is, the long-term expected utility is a summation from a particular period to the end of the time horizon. Discounting future utility is optional. Preferably, calculations proceed from the end of the time horizon backwards, so that long-term expected utility values of later periods are available when calculating expected utility values of control actions taken in earlier periods. Long-term utility values are expressed as expected utility values that result from particular control actions. This involves applying a probability distribution function to determine likely future outcomes. A level of risk and reward in a portfolio is expressed as an expected gain subject to variance. The gain and variance parameters are typically applied to a normal distribution of likely outcomes. In the discrete case, a discrete variation on the normal distribution is applied, optionally ignoring tails of the distribution beyond a predetermined threshold. In one embodiment, the utility of failing at any time through the time horizon to satisfy the essential expenditure goals is prohibitive. A logarithmic utility function can be scaled so that not meeting or barely meeting the funding level required for essential goals has an infinitely negative utility. Continuous functions that have very steep slopes near the point of barely funding essential goals also make it prohibitive to fail to satisfy the goals. A rule that assigns an infinitely negative utility to missing an essential goal has the same effect, regardless of the shape of utility function elsewhere. By prohibitive, we mean that encountering more than a remote probability $\alpha$ of missing an essential goal at any time during the time horizon, where $\alpha \leq 0.05$, or preferably $\leq 0.01$, or more preferably $\leq 0.001$, causes the utility over the time horizon to be lower or less favorable than the utility of courses of action that do not have the threshold probability of missing any essential goal.

The control action recommendation module outputs at least recommended control actions for the beginning period of the analysis. That is, control actions to be followed immediately may result from the analysis. These control actions may include at least a consumption level and a portfolio risk level. Optionally, the control actions may be linked to further modules that refine control actions in terms of particular assets. The control actions also may be linked to modules that automatically implement the control actions.

A further aspect of this invention is a control strategy evaluation system that includes the planning server. In this embodiment, the planning server control recommendation module outputs a control strategy data cube that includes control strategies for selection of consumption levels and selection of portfolio risks that span dimensions of the search grid. The control strategy data cube would include recommended consumption and risk levels spanning at least the time horizon and resource values found in the search grid. The control strategy evaluation system would further include a simulation server 715 that accesses the control strategy data cube and conducts at least 50 probabilistic simulation runs over the time horizon. The simulation runs would apply the control strategies to the simulated intermediate economic events and report the distribution of simulated outcomes. The simulation server might perform at least 100 probabilistic simulation runs, or preferably 500 probabilistic simulation runs, or more preferably 1000 probabilistic simulation runs in order to generate a statistically significant distribution of outcomes.

Another embodiment disclosed is a computer implemented method for selecting at least immediate control actions in a multi-year planning setting. The years in the planning setting may be treated as years subdivided into months or weeks. With sufficient computing resources, the periods could be subdivided into weeks or days. The method includes accessing electronic data compilations of portfolio information, goal information and market information. The portfolio information includes pluralities of investment and non-investment resources available over multiple time periods. The goal information includes pluralities at one time and repeating expenditure goals, and at least two levels or classes of priority that span the essential and nonessential expenditure goals. Preferably, the priority levels include essential, target and aspirational goals. Additional goals or even selection of goals on a continuum can be used to express the goal information. Individual goals, such as payment of living expenses, may be broken into parts and represented partially as an essential goal and partially in another priority level or class. Market information includes estimates available, investment opportunities, risks, rewards and covariance ratios among assets. The covariance ratios allow calculation of an overall statistical portfolio of assets with mixed characteristics. The information on which the method operates should be treated as part of the environment in which the method has practical application. Alternatively, in another embodiment, aspects of compiling the data may become part of the method.

The method begins with accessing the data compilations and calculating alternative diversified risk portfolios with a range of available risk levels for particular times within a time horizon. The available risk levels may be expressed in terms of variability of returns (such as statistical variance) or value-at-risk. When the value-at-risk approach is taken, the value-at-risk level may be expressed as a percentage of resources at risk, given either a predetermined probability or predetermined confidence level and a predetermined at-risk period. The alternative portfolios may be selected using a variation on Markowitz's classical method or some equivalent approach. Those portfolios that produce the greatest return for a given degree of risk can be described as being on the efficient frontier. Optionally, the alternative diversified portfolio calculation can take into account the covariance ratios between investment and non-investment resources. As the mix of investment and non-investment resources changes, preferences among alternative portfolios may change. The calculation of alternative diversified portfolios may take into account both assets that can be liquidated and redeployed and assets that are locked in position. The calculation also may take into account initial conditions of portfolio risk level and embedded gain. The initial portfolio risk level indicates the extent of turnover required to reach an alternative risk level. The embedded gain indicates the tax liability to be realized due to a particular extent of turnover.

The method continues with assigning a search grid spanning on subdividing dimensions of the problem. It effectively converts a continuous problem into a discrete problem that is amenable to numerical algorithms. The search demand grid dimensions may include the time horizon of analysis, the range of available risk levels, potential resource levels and a range of consumption levels that meet at least essential goals. Information in the data compilations, some of which may be hard coded into a program implementing the method, can be used to generate the search grid, optionally subject to revision by a user. Potential resource values optionally may include both investment and non-investment resources, especially when non-investment resources are available to satisfy goals. For instance, salaries and Social Security benefits may be included in the resources. The consumption level optionally may be expressed as a ratio of resource or combined resource values. The search grid is output for use by the next computer implemented module. The output may be an object stored in memory or persisted to a nonvolatile memory. It may be a handful of parameters passed to another module.

The method further continues with evaluating control actions for particular times within the time horizon and particular combined resource values. The control actions evaluated include it least selection of a consumption level and selection of a risk level. The consumption level may be a ratio selected from a range of ratios. Selected control actions can be followed by advisers or automatically implemented by other modules.

Evaluating the control actions at least combines an immediate utility of consumption resulting from chosen control actions and long-term expected utility of results probabilistically expected to be achieved as a consequence of the chosen control actions. The immediate utility relates to a particular time, typically the current period of analysis or the next period. The long-term expected utility of a particular result expresses utility from that point forward to the end of the time horizon. That is, long-term expected utility is a summation from a particular period to the end of the time horizon. Discounting future utility is optional. Preferably, calculations proceed from the end of the time horizon backwards, so that long-term expected utility values of later periods are available when calculating expected utility values of control actions taken in earlier periods. Long-term utility values are expressed as expected utility values that result from particular control actions. This involves applying a probability distribution function to determine likely future outcomes. The level of risk and reward in a diversified risk portfolio can be expressed as the expected gain subject to a variance. The gain and variance parameters are typically applied to a normal distribution of likely outcomes. In the discrete case, a discrete variation on the normal distribution or another selected distribution is applied. In one embodiment, the utility of failing, with more than a remote probability, at any time through the time horizon to satisfy the essential expenditure goals is prohibitive. A logarithmic utility function can be scaled so that not meeting or barely meeting the funding level required for essential goals has been infinitely negative utility. Continuous functions that have very steep slopes near the point of barely funding essential goals also make it prohibitive to miss the goals. A rule that assigns an infinitely negative utility to missing an essential goal has the same effect, regardless of the shape of utility function. By prohibitive, we mean that encountering more than a remote probability $\alpha$ of missing an essential goal at any time during the time horizon, where $\alpha \leq 0.05$, or preferably $\leq 0.01$ or more preferably $\leq 0.001$, causes the utility over the time horizon to be lower or less favorable than the utility of courses of action that do not have the threshold risk of missing any essential goal.

The method also includes outputting at least beginning period control actions that select a consumption level and a portfolio risk level corresponding to results of the evaluating. These control actions may include at least a consumption level and a portfolio risk level. Optionally, the control actions may be linked to further modules that refine control actions in terms of particular assets. The call control actions also may be linked to modules that automatically implement the control actions.

As a further aspect of this method, resources and expenditure goals may be characterized in current dollars or in constant purchasing power. When resources and claims are characterized in this way, a range of inflation factors may be included in the search grid. A probability distribution function may be established for changes in inflation rates. Or, sensitivity analysis may be provided regarding how various inflation rates impact the outcome. Depending on the embodiment, the consumption level stated as a percentage of resources, may be a percentage of investment resources, unlocked investment resources, or combined investment and non-investment resources. The non-investment resources may include at least a home, and employment income (in some time period) and a Social Security entitlement.

A further aspect of the method addresses taxable events. To practice this aspect of the method, the portfolio information includes embedded gain information. The method is extended by evaluating generation of taxable gain due to portfolio activities such as rebalancing and liquidating assets and tax liability resulting from taking the control actions. Both the consumption and the risk level control actions can produce tax liability. Consumption typically requires generation of cash. Adjusting the risk level for a portfolio typically requires rebalancing.

In some embodiments, non-investment resources can be sold to generate consumable resources. The method may be extended by setting a time span in which a particular non-investment resource can be sold and taking into account tax consequences of selling the non-investment resource. Sometimes, sale of the non-investment resource may be coupled to the purchase of a replacement non-investment resource. For instance, a time for selling the family home may be paired with the purchase of a replacement home.

One utility function that may be used is a logarithmic utility function scaled to set a negatively infinite utility of exactly satisfying or of failing to satisfy the essential goals in a particular time period. Other potential utility functions are mentioned above.

An alternative utility function applies a rule whereby control action that produces a probability above a predetermined threshold of failing to satisfy the essential goals eliminated from consideration. This rule can be combined with a variety of utility functions in consumption ranges that satisfy the essential goals.

The method may be further extended by outputting a control strategy data cube including control strategies for selection of consumption and portfolio risk levels. The control strategy data cube spans the time horizon and the resource or combined resource values of the search grid.

A control strategy data cube may be consumed by a simulation engine that follows the control strategies in the data cube and conducts at least 50 simulation runs over the time horizon to distribute to generate a distribution of outcomes. The simulation engine reports the distribution of outcomes.

A further aspect of the method includes, prior to evaluating the control actions, constructing a resources and claims analysis and qualifying the goals or at least the essential goals is likely to be satisfied by the resources available. In addition to balancing total resources and claims, the problem to be solved may be qualified as feasible by constructing a cash flow analysis and comparing the timing of the claims to the timing of resources available.

While the present invention is disclosed by reference to the preferred embodiments and examples detailed above, it is understood that these examples are intended in an illustrative rather than in a limiting sense. Computer-assisted processing is implicated in the described embodiments. It is contemplated that modifications and combinations will readily occur to those skilled in the art, which modifications and combinations will be within the spirit of the invention and the scope of the following claims.

We claim as follows:

1. A computer-implemented method for generating a recommended a control action policy in a multi-year planning setting, the method including:
    retrieving mean return, variance and covariance data for multiple of classes of prospective investments;
    electronically calculating, from the retrieved data, returns on alternative diversified portfolios that include the prospective investments;
    setting up a computer-solvable problem, including assigning a search grid spanning and subdividing at least
        a time horizon,
        potential resource values for an investor's portfolio,
        a range of spending levels that satisfy essential goals of the investor and are then applied to satisfying the investor's non-essential goals, and
        the range of risk taking levels; and
    working backwards through the time horizon,
        using a computer to evaluate potential control actions for particular times and resource values within the search grid,
        selecting recommended control actions for the particular times and resource values, the control actions setting spending and risk taking levels for the particular times, and
        combining the control actions into a control action policy that includes the recommended spending and risk taking levels for combinations of the particular times and resource values;
    wherein using the computer to evaluate the potential control actions for the particular times and resource values includes calculating a utility of potential spending and risk taking levels,
        such that the utility at a specific time and resource value for the potential spending and risk taking levels combines at least
            a utility in the specific time of the spending and
            a future expected utility through an end of the time horizon of future spending and risk taking levels; and
        such that the utility calculation recognizes a greater utility of satisfying the essential goals than of satisfying the non-essential goals; and
    outputting at least part of the control action policy for the time horizon and the potential resource values, including recommendations for the spending and the risk taking levels.

2. The method of claim 1, further including:
    choosing for at least one of the essential and/or non-essential goals whether to express an amount that satisfies a particular goal in constant dollars or current purchasing dollars; and
    including in the search grid a range of inflation factors.

3. The method of claim 1, further including:
    summarizing the alternative diversified portfolios with efficient frontiers;
    expressing the risk taking levels in terms of value-at-risk as a percentage of resources, given a selected probability or confidence level and a holding period; and
    outputting the value-at-risk expression for a user to review.

4. The method of claim 1, wherein the alternative diversified portfolios further include at least a home, an employment income and a social security entitlement.

5. The method of claim 1, further including retrieving data regarding embedded gain for tax purposes of at least one investor resources, wherein:
    the search grid further includes a range of embedded gain; and
    the evaluating includes realizing tax consequences of selling the resource with the embedded gain to satisfy at least one of the essential and/or non-essential goals.

6. The method of claim 5, wherein the investor's resource with the embedded gain is a home and sale of the home is paired with purchase of a replacement home.

7. The method of claim 1, further including outputting a control policy datacube, the control policy datacube spanning the time horizon and potential resource values of the search grid.

8. The method of claim 7, further including:
    beginning with the current resources and following the control action policy included in the control policy datacube, conducting at least 50 probabilistic simulation runs over the time horizon to generate a distribution of outcomes; and
    reporting the distribution of outcomes.

9. The method of claim 1, further including:
    prior to the evaluating the control actions, constructing a resources and claims analysis and qualifying the essential and non-essential goals as likely to be satisfied by the resources that are available.

10. The method of claim 9, further including:
    constructing a cash flow analysis and qualifying timing of the essential and non-essential goals as feasible, given timing of the resources that are available.

11. A planning server for selecting at least immediate control actions in a multi-year planning setting, the planning server including:
   a first processor programmed to
      access mean return, variance and covariance data for multiple of classes of prospective investments, and
      determine returns on alternative diversified portfolios that include the prospective investments;
      store the returns on the alternative diversified portfolios;
   a second processor programmed to generate a search grid spanning and subdividing at least
      a time horizon,
      potential resource values for an investor's portfolio,
      a range of spending levels that satisfy essential goals of the investor and are then applied to satisfying the investor's non-essential goals, and
      the range of risk taking levels; and
   a third processor programmed to access the search grid and the stored returns on the alternative diversified portfolios and works backwards through the time horizon,
      to evaluate potential control actions for particular times and resource values within the search grid,
      to select recommended control actions for the particular times and resource values, the control actions setting consumption and risk taking levels for the particular times,
      to combine the control actions into a control action policy that includes the recommended spending and risk taking levels for combinations of the particular times and resource values, and
      to output the control action policy that includes the consumption and the risk taking levels;
   wherein the third processor calculates a utility of potential spending and risk taking levels, such that the utility at a specific time and resource value for the potential spending and risk taking levels combines at least
      a utility in the specific time of the spending that recognizes a greater utility of satisfying the essential goals than of satisfying the non-essential goals, and
      a future expected utility through an end of the time horizon of future spending and risk taking levels.

12. The planning server of claim 11, wherein:
   the first processor is further programmed to
      access pay and likelihood of unemployment estimates for human capital and covariance estimates between the human capital and the prospective investments, and house price return and variance data for a housing resource and covariance estimates between the housing resource and the prospective investments,
      determine returns on the alternative diversified portfolios that include the prospective investments, the human capital and the housing resource, and
      filter among the alternative diversified portfolios so that the human capital and the housing resource of the alternative diversified portfolios conform to resources of the investor and the essential and/or non-essential goals set by the investor for retirement age and for holding or selling the housing resources.

13. A control strategy evaluation system including the planning server of claim 11, further including:
   a lifetime control policy simulation server that
      accesses the control action policy output by the third processor and conducts at least 50 probabilistic simulation runs over the time horizon, which simulation runs apply the control action policy to generate a distribution of outcomes, and
      reports at least the distribution of the outcomes.

14. The planning server of claim 11, wherein the first processor, the second processor and the third processor share processing resources.

* * * * *